(12) United States Patent
Bolognese et al.

(10) Patent No.: US 10,568,451 B2
(45) Date of Patent: Feb. 25, 2020

(54) DISPENSING ASSEMBLY FOR MACHINES FOR PREPARING LIQUID PRODUCTS BY MEANS OF CAPSULES

(71) Applicants: LUIGI LAVAZZA S.p.A., Turin (IT); ARGOTEC S.r.l., Turin (IT)

(72) Inventors: Danilo Bolognese, Turin (IT); Luca Bugnano, Moncalieri (IT); Alberto Cabilli, Moncalieri (IT); Denis Rotta, Turin (IT)

(73) Assignees: LUIGI LAVAZZA S.p.A., Turin (IT); ARGOTEC S.r.l., Turin (IT)

( * ) Notice: Subject to any disclaimer, the term of this patent is extended or adjusted under 35 U.S.C. 154(b) by 218 days.

(21) Appl. No.: 15/510,113

(22) PCT Filed: Jun. 25, 2015

(86) PCT No.: PCT/IB2015/054787
§ 371 (c)(1),
(2) Date: Mar. 9, 2017

(87) PCT Pub. No.: WO2016/038474
PCT Pub. Date: Mar. 17, 2016

(65) Prior Publication Data
US 2017/0251862 A1 Sep. 7, 2017

(30) Foreign Application Priority Data
Sep. 11, 2014 (IT) .............................. TO2014A0712

(51) Int. Cl.
*A47J 31/36* (2006.01)
*A47J 31/40* (2006.01)

(52) U.S. Cl.
CPC ....... *A47J 31/3633* (2013.01); *A47J 31/3628* (2013.01); *A47J 31/3638* (2013.01); *A47J 31/3642* (2013.01); *A47J 31/407* (2013.01)

(58) Field of Classification Search
CPC ................ A47J 31/3623; A47J 31/3628; A47J 31/3633; A47J 31/3638; A47J 31/3642
(Continued)

(56) References Cited

U.S. PATENT DOCUMENTS 8,627,761 B2 * 1/2014 Giua ................... A47J 31/3676
99/289 R
2010/0107890 A1 * 5/2010 Zanetti ................ A47J 31/0673
99/295
(Continued)

FOREIGN PATENT DOCUMENTS

CN 201341791 Y * 11/2009 .......... A47J 31/3638
WO WO 2010/081311 7/2010
(Continued)

OTHER PUBLICATIONS

International Search Report and Written Opinion of the ISA for PCT/IB2015/054787, dated Aug. 31, 2015, 10 pages.

*Primary Examiner* — Reginald Alexander
(74) *Attorney, Agent, or Firm* — Nixon & Vanderhye P.C.

(57) ABSTRACT

A dispensing assembly for a machine for preparing a liquid food product by means of capsules including
a casing having an inlet passage, suitable for enabling insertion of a capsule into the dispensing assembly, and an outlet passage, suitable for enabling discharge of the capsule from the dispensing assembly,
an infusion chamber which comprises two chamber parts, at least one of which defines a housing for at least partially receiving the capsule,
retention elements, for keeping the capsule in a retaining position, essentially coaxial to the two chamber parts, the retention elements being within the casing in an intermediate position between the inlet and outlet passages, to be operative between the two chamber parts when they are in a spaced-apart position,
an actuation system, operable for causing relative movements between the two chamber parts according to an actuation axis, between the spaced-apart position and a close position, (Continued)

a guide member mounted at the inlet passage to be displaceable between an inoperative position and an operative position, in which access to the inlet passage is allowed or prevented, respectively, a longitudinally extended pusher member engaged in a respective guide of the guide member, to be displaceable according to a respective sliding axis between a first position and a second position, the sliding axis being generally transverse to the actuation axis when the guide member is in the operative position.

With the guide member in the operative position and with the first chamber part and the second chamber part in the spaced-apart position, a displacement of the pusher member from the first position to the second position causes a thrust on the capsule towards the outlet passage, in order to free the capsule from the retention means.

14 Claims, 25 Drawing Sheets

(58) Field of Classification Search
USPC .............................................. 99/289 R, 295
See application file for complete search history.

(56) References Cited

U.S. PATENT DOCUMENTS

| 2011/0017072 A1* | 1/2011 | Frigeri | A47J 31/3676 |
| | | | 99/289 P |
| 2013/0068110 A1 | 3/2013 | Pagano | |

FOREIGN PATENT DOCUMENTS

| WO | WO 2012/085774 | 6/2012 |
| WO | WO 2014/020519 | 2/2014 |

* cited by examiner

Fig. 23
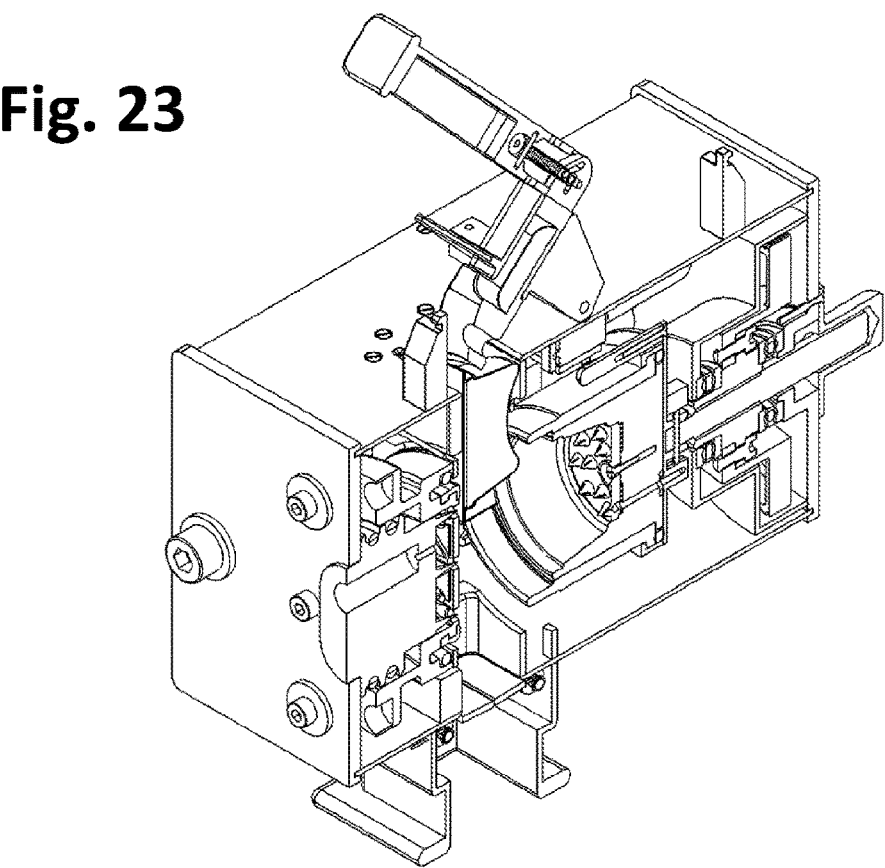
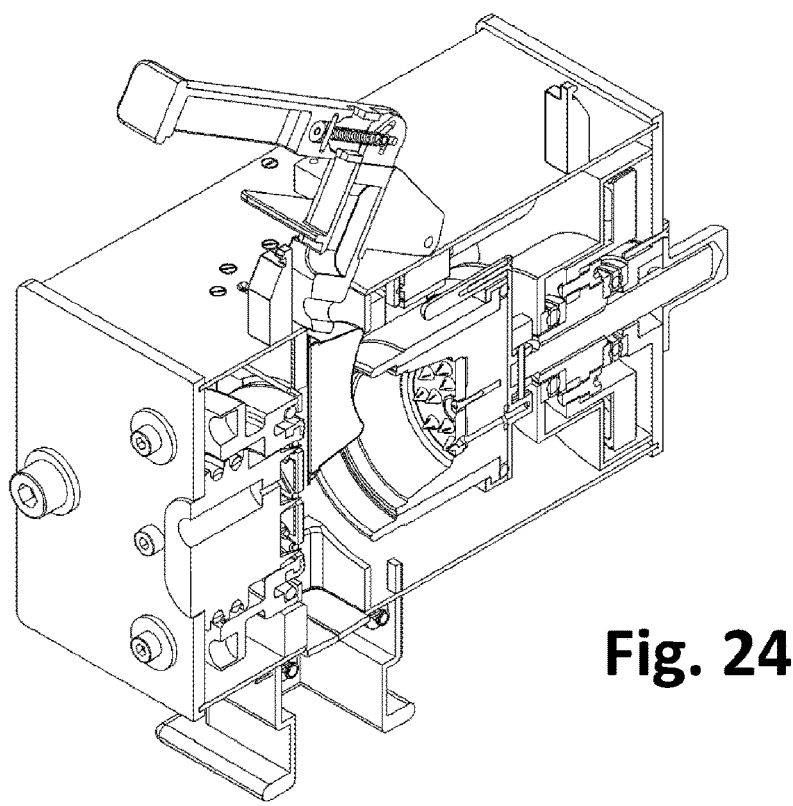
Fig. 24

Fig. 25
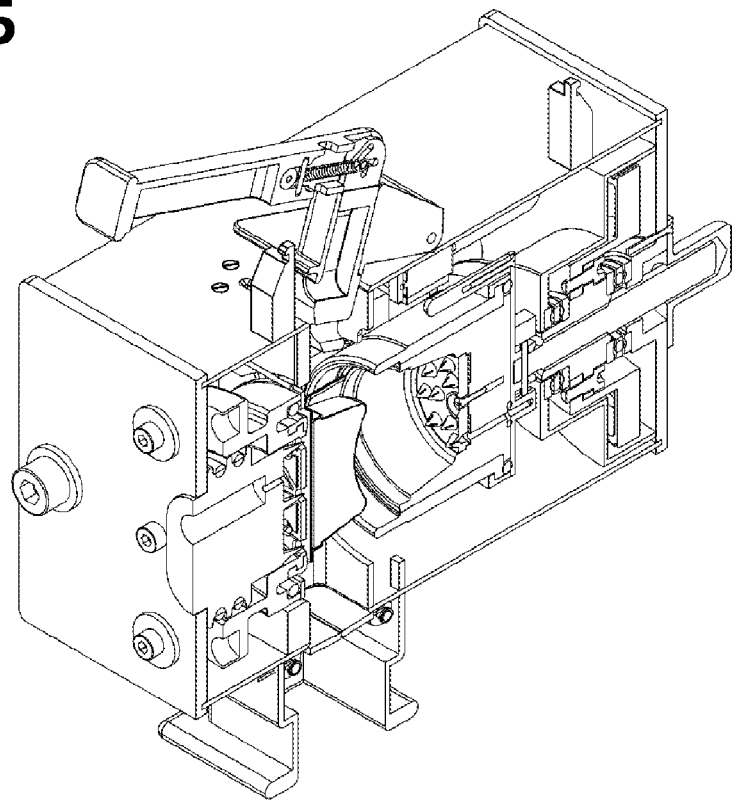
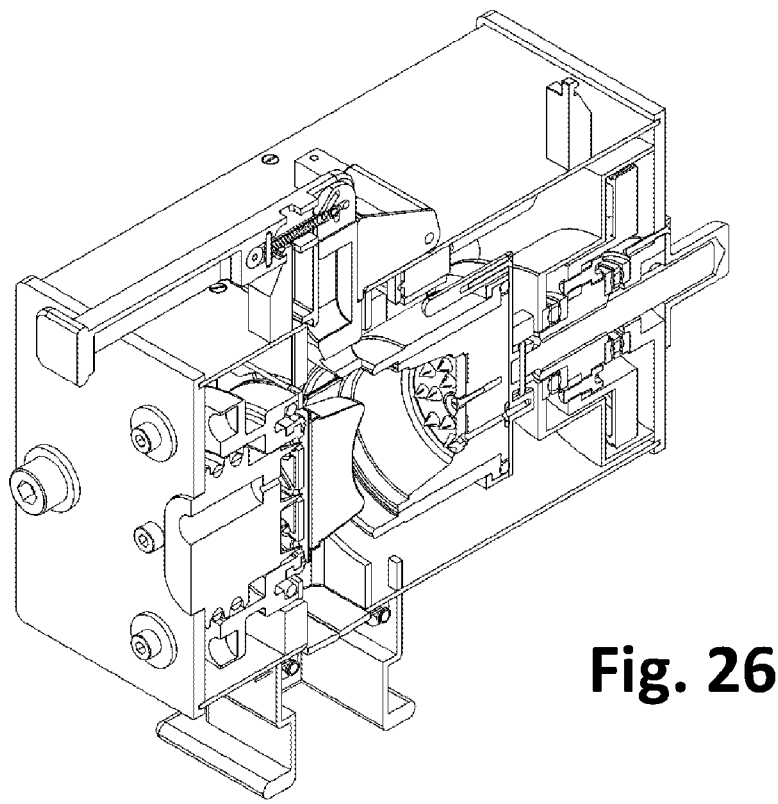
Fig. 26

Fig. 27
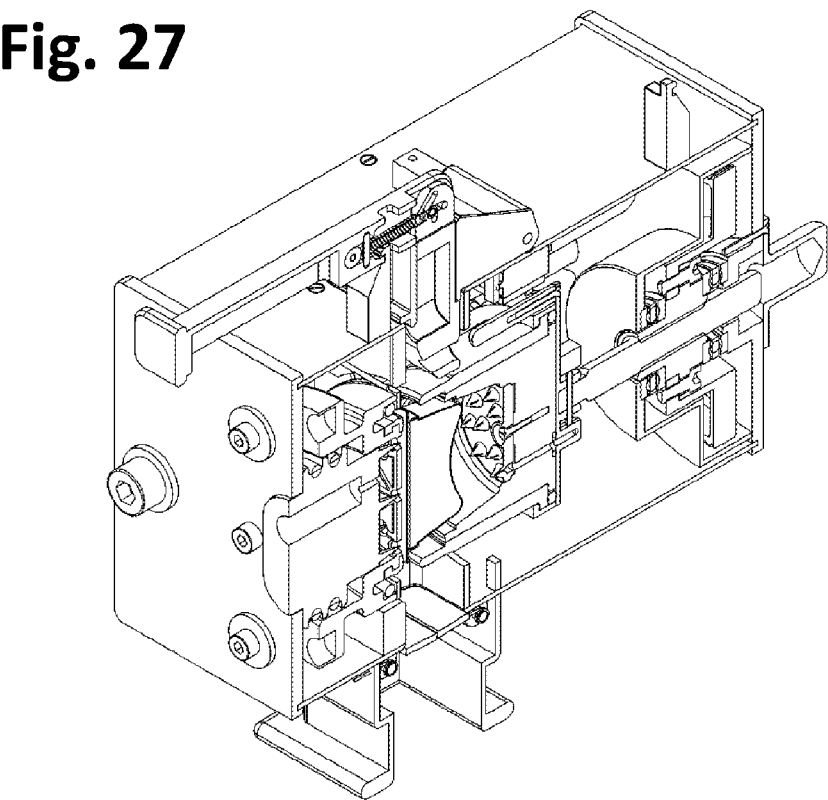
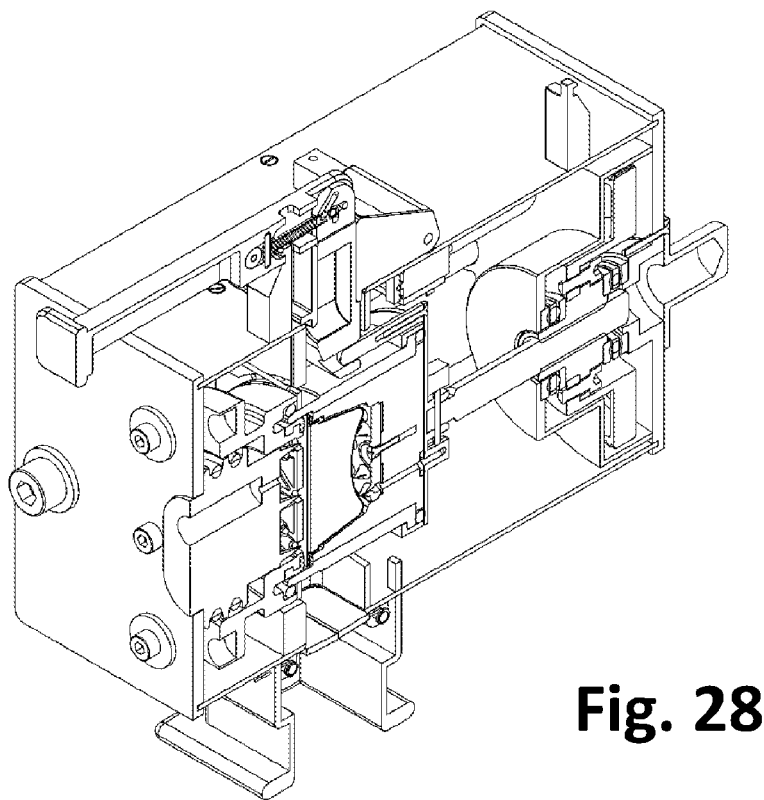
Fig. 28

Fig. 29
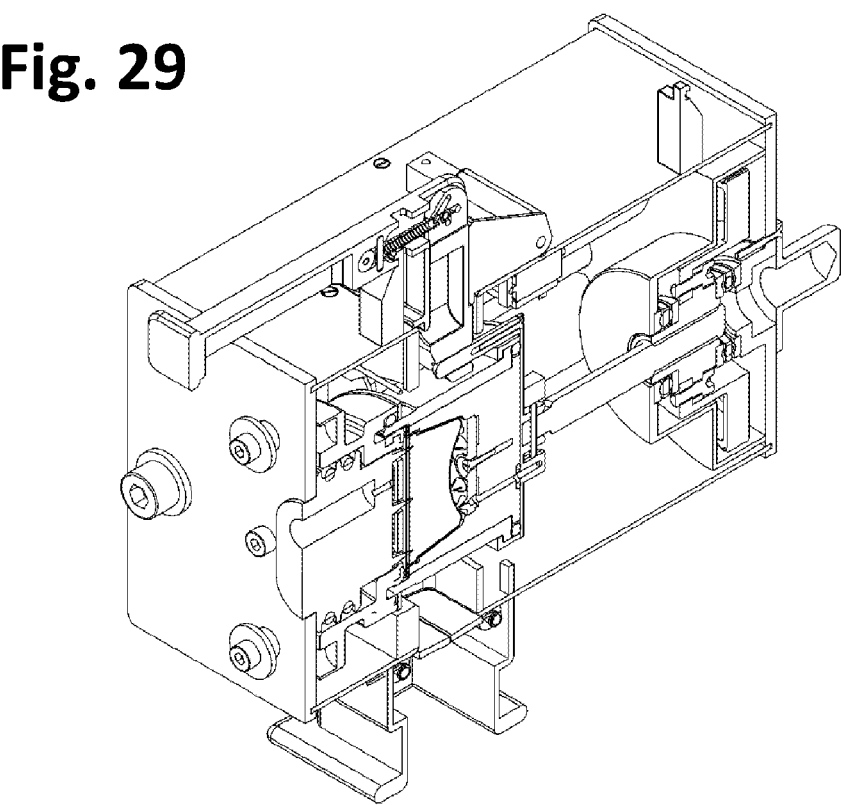
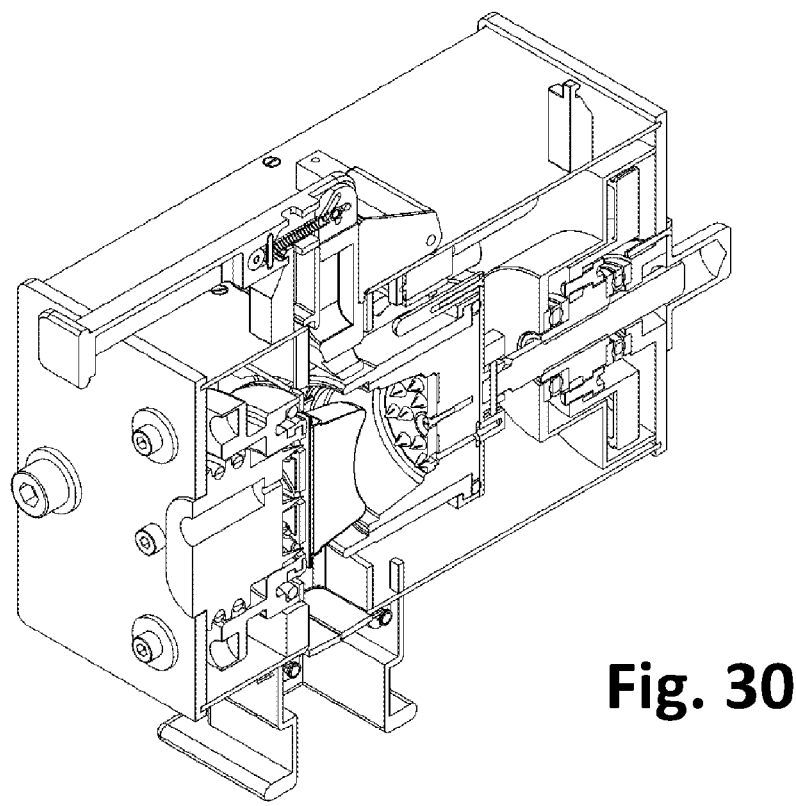
Fig. 30

Fig. 31
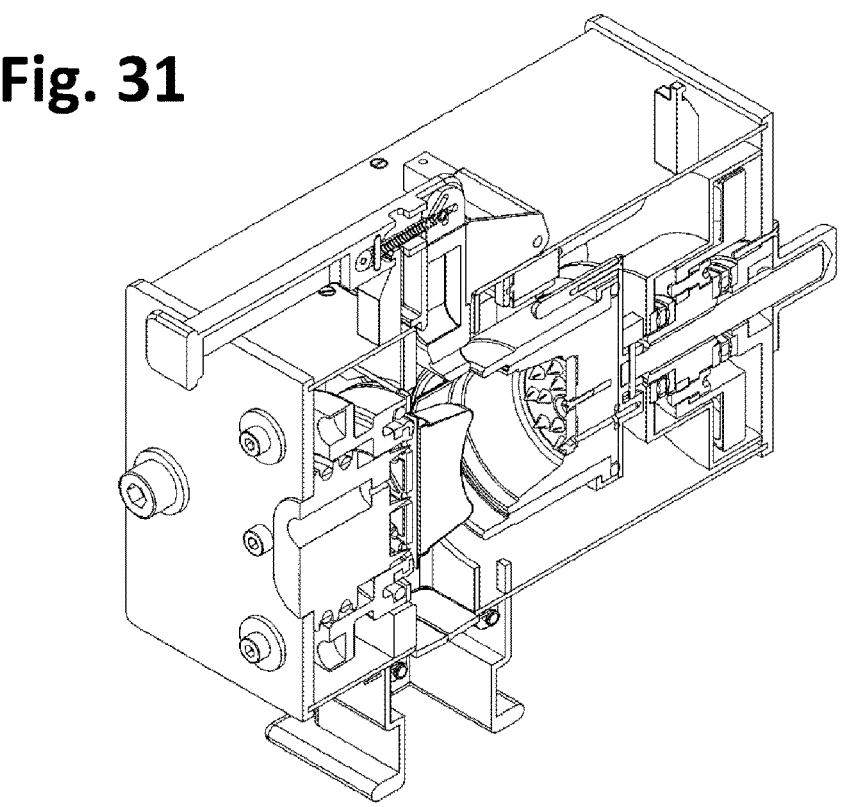
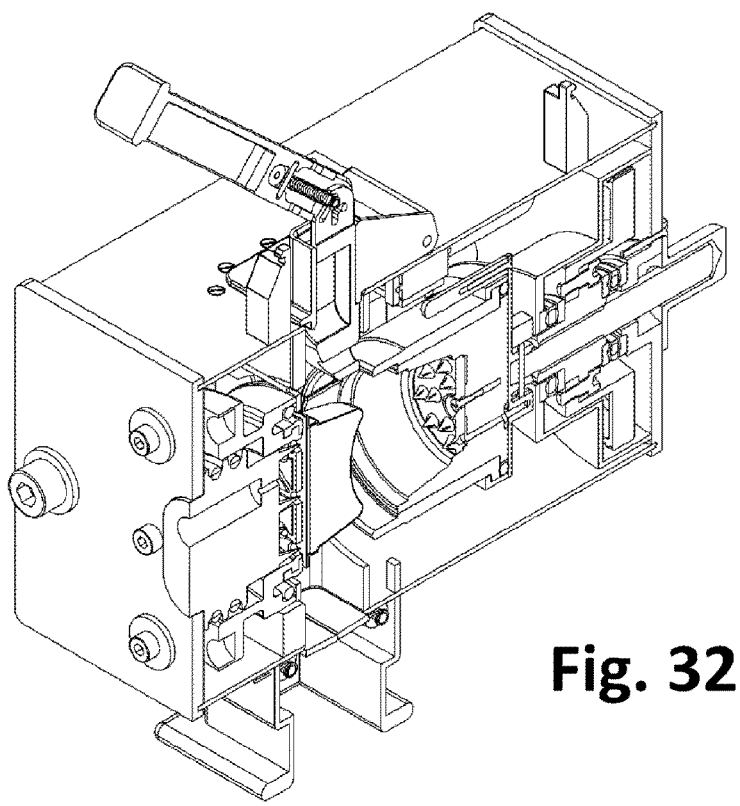
Fig. 32

Fig. 35
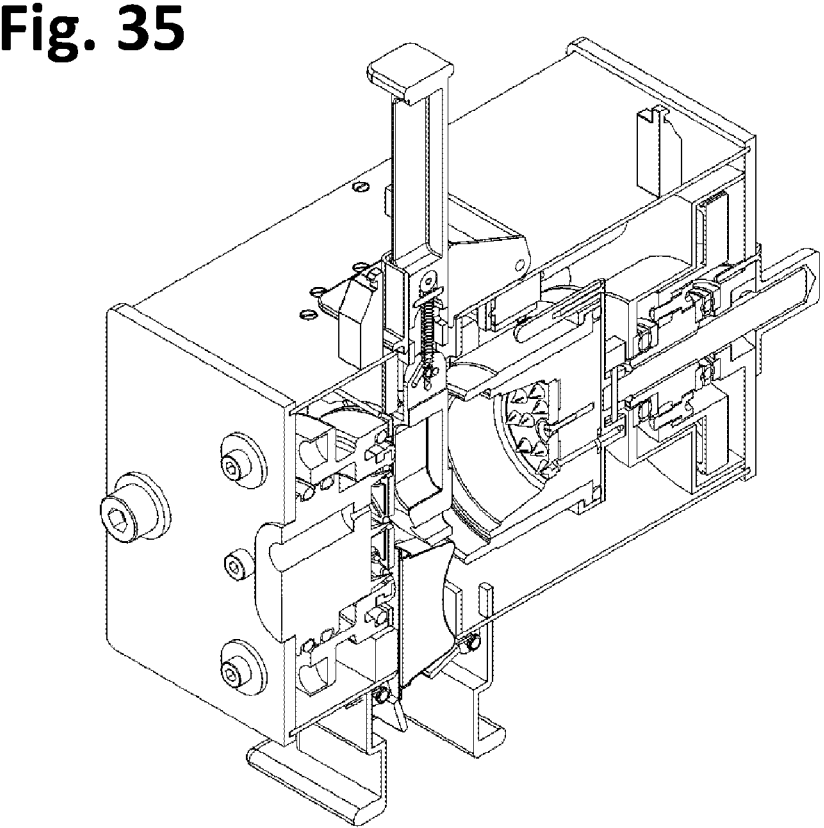
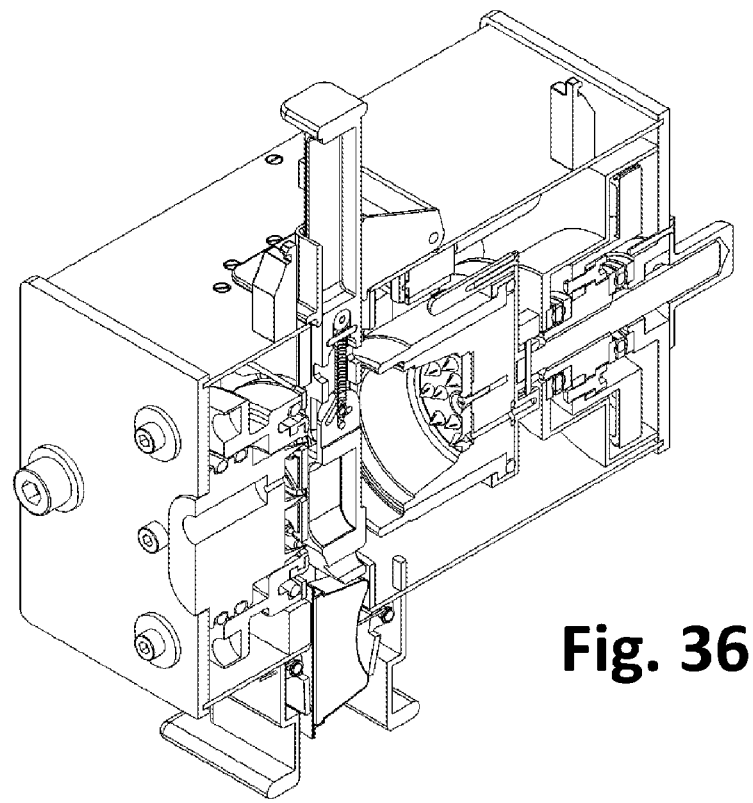
Fig. 36

Fig. 37
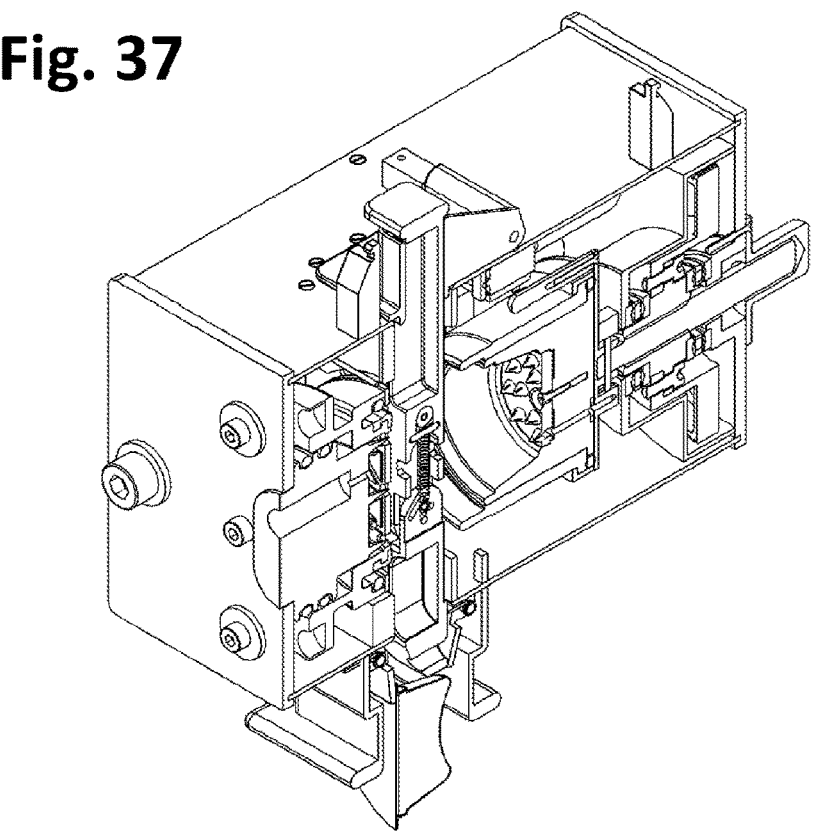
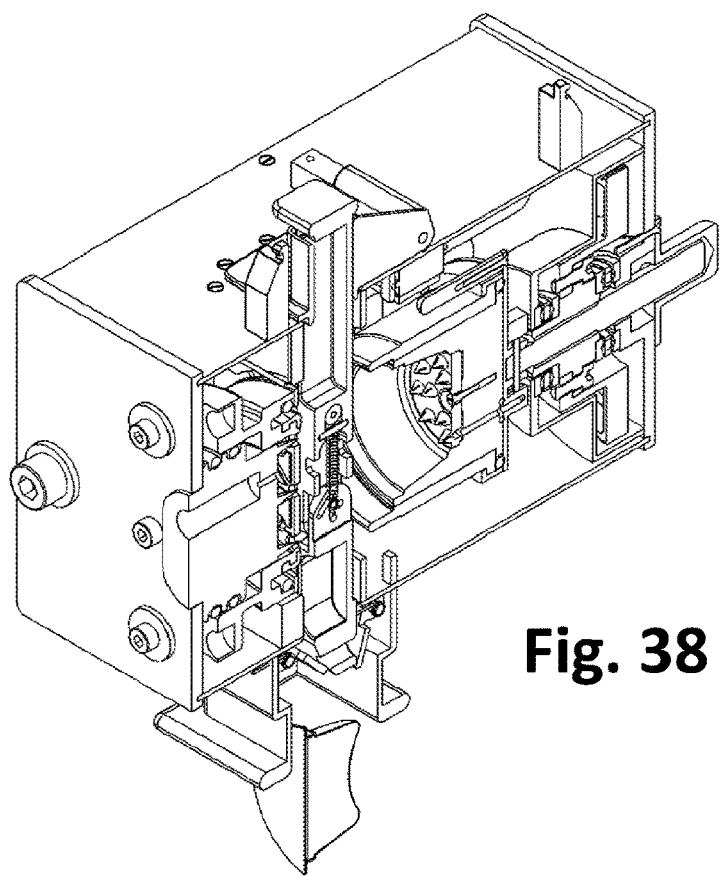
Fig. 38

DISPENSING ASSEMBLY FOR MACHINES FOR PREPARING LIQUID PRODUCTS BY MEANS OF CAPSULES

This application is the U.S. national phase of International Application No. PCT/IB2015/054787 filed 25 Jun. 2015, which designated the U.S. and claims priority to IT Patent Application No. TO2014A000712 filed 11 Sep. 2014, the entire contents of each of which are hereby incorporated by reference.

FIELD OF THE INVENTION

The present invention relates to machines, to systems and to methods for preparing liquid food products by means of capsules, and has been developed with particular reference to dispensing assemblies for such machines.

PRIOR ART

Dispensing assemblies of the type indicated usually comprise an infusion chamber formed in two parts, typically a capsule-holder and an injector, of which at least one is movable relative to the other to assume a spaced-apart position and a close-position. In these assemblies, there is the problem of having to temporarily support the capsule in an intermediate position between the two parts of the infusion chamber, when these are in the spaced-apart position and the capsule is introduced into the assembly. For this purpose, retention means are usually provided, which retain the capsule following its insertion into the assembly: in general, during the relative movement towards the close position, the capsule is taken over by the capsule-holder, while during the subsequent return movement towards the spaced-apart position, the retention means cause the extraction of the capsule from the capsule-holder.

In some solutions (see for example WO 2006/005736 A), the retaining function is performed by means of a gripper device, including two opposed jaws arranged transversely to the actuation axis of the assembly: in these cases, removing a used capsule from the assembly implies that a new capsule is inserted into the assembly itself.

Dispensing assemblies have also been proposed in which the retention means of the capsule are configured to also fulfill a releasing function of the used capsule, during a movement away of the injector device from the infusion chamber. A solution of this type is known, for example, from EP 2046170 A, according to which the injector laterally supports two opposite frontally-protruding arms. When the injector is in the distanced position from the capsule-holder, the arms are elastically pushed into a closed condition, in order to be able to support the capsule. Then, during the advancing of the capsule-holder towards the injector, the arms are spread apart by the capsule-holder, causing disengagement of the capsule when it has already partially entered into the capsule-holder. After dispensing the beverage, the retraction of the capsule-holder with respect to the injector results in the closing of the arms, which then engage the capsule once more and cause its extraction from the capsule-holder and successive fall by gravity into the outlet passage of the assembly.

In other solutions, gripping members having similar functionalities are supported in a movable manner by a respective guide member integral with the stationary structure of the assembly (see for example EP 2077087 A), which retain the capsule after its insertion into the assembly and then, during the relative movement between the two parts of the infusion chamber, release the capsule, which can fall by gravity towards the outlet passage of the assembly.

In other solutions still, the assembly is provided with an ejector rod, slidingly inserted into an opening provided in the bottom of the capsule-holder and essentially coaxial to the displacement axis of the capsule-holder. In these solutions (see for example WO 2012/168918 A) gripping arms are usually provided in an intermediate position with respect to the two parts of the infusion chamber, which have the function of initially retaining the capsule until it is taken over by the capsule-holder. During the subsequent retraction of the capsule-holder towards the spaced-apart position with respect to the injector, front teeth of the capsule-holder cause detachment of the capsule from the injector and the ejector rod causes its complete exit from the capsule-holder, with subsequent falling by gravity towards the outlet passage of the assembly.

Solutions of the type described in WO 2006/005736 A are disadvantageous from a hygienic point of view, particularly when the machine is not used for a certain period of time: in fact both the substance used for the infusion, and residues of water remain within the empty cartridge, which, with the passage of time, can give rise to unpleasant odors or mold.

The other types of indicated solutions are generally complex and involve particular arrangements of the assembly components, potentially subject to wear and to jamming in the long run.

The operation of assemblies according to the prior art also assumes that the discharge of the used capsules always occurs by gravity: this circumstance limits, to a certain extent, the flexibility of production and positioning of the assemblies themselves.

AIM AND SUMMARY OF THE INVENTION

In its general terms, the aim of the present invention is to provide an improved and compact dispensing assembly, which is simple from the constructive and functional point of view, as well as convenient for a user, compared to the known solutions mentioned. One auxiliary aim of the invention is to provide a dispensing assembly that is suitable for operation in a plurality of different possible orientations, without this affecting the quality of operation or the discharge of the used capsules.

According to the invention, one or more of the aforesaid aims is achieved thanks to a dispensing assembly for machines for preparing liquid food products, by means of capsules, having the characteristics referred to in claim 1. The invention also relates to a machine, a system and a method for preparing liquid food products. Advantageous developments of the invention form the subject of the subclaims. The claims form an integral part of the disclosure provided here in relation to the invention.

BRIEF DESCRIPTION OF THE DRAWINGS

The invention will now be described with reference to the attached drawings, provided purely by way of non-limiting example, in which:

FIGS. 19-44 are views similar to those of FIG. 5, intended to exemplify an operating sequence of a dispensing assembly of a machine according to an embodiment of the invention.

DETAILED DESCRIPTION

In the following description, various specific details are illustrated aimed at a thorough understanding of the embodiments. The embodiments can be implemented without one or more of the specific details, or with other methods, components, materials, etc. In other cases, structures, materials, or operations that are known, or obvious for the skilled person, are not shown or described in detail, to avoid obscuring the various aspects of the embodiments. The reference to "an embodiment" within the framework of this description indicates that a particular configuration, structure or characteristic described in relation to the embodiment is included in at least one embodiment. Therefore phrases such as "in an embodiment", "in one embodiment" and the like, which may be present at different points in this description, do not necessarily refer to the same embodiment. Furthermore, particular conformations, structures or characteristics may be combined in any suitable manner in one or more embodiments. The references used herein are for convenience only and therefore do not define the field of protection or the scope of the embodiments.

Figure 1:
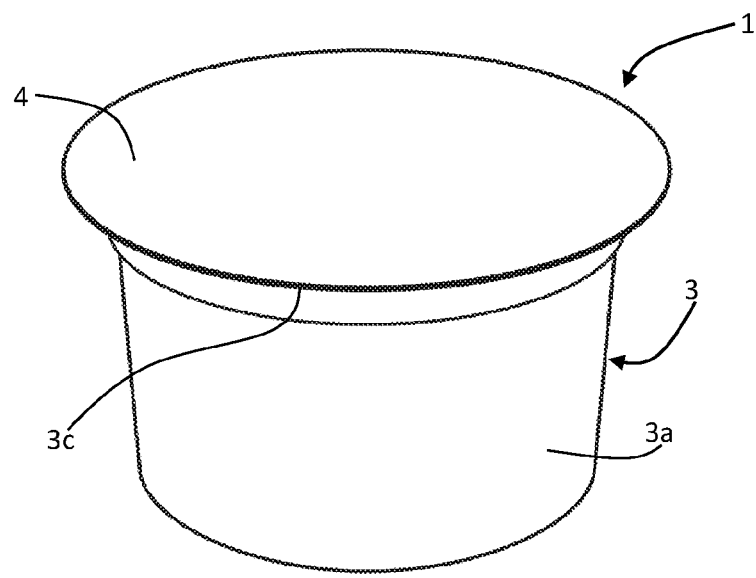
FIGS. 1 and 2 are schematic views, in perspective and in cross-section, respectively, of a generic capsule usable in a dispensing assembly according to the present invention.
Figure 2:
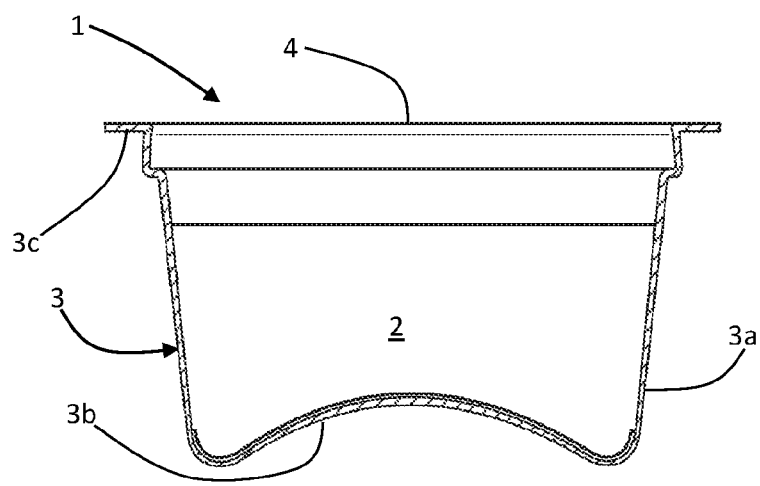

In FIGS. 1 and 2, a capsule (or cartridge, or pod, according to other common terminology) is illustrated, merely by way of example, for use in a dispensing assembly according to the present invention. This capsule, indicated as a whole by 1, is of an essentially known type and is described here only for the purposes of an easier understanding of an embodiment of the present invention.

The capsule 1 contains a dose 2 of at least one substance capable of forming a liquid food product by means of water and/or steam. The dose 2 may consists of coffee powder, or of some other precursor of a liquid product, such as for example a beverage, tea, chocolate powder or grains, products for preparing broths, soups, soft drinks and infusions of various nature: this list must be considered as being exemplative and not exhaustive.

Below, for simplicity, reference will be made to the preparation of coffee, with the dose 2 that is meant to consist of coffee powder. In the structure of the capsule 1, overall essentially bowl- or little cup-shaped, within which is located the dose 2, the following can be identified:
- a body 3, comprising a side or peripheral wall 3a and a bottom wall 3b, which closes the body 3 at one end of the side wall 3a, and
- a closing wall 4, which closes the capsule 1 at the end opposite to the bottom wall 3b.

In the illustrated example, the capsule 1 is a hermetically closed capsule, with the wall 4 being formed of a sealing foil. The body of the capsule 1 is generally semi-rigid, preferably molded in plastic material, for example polypropylene-based, while the wall 4 is formed of a flexible sheet material, for example aluminum-based. The invention is, in any case, also capable of use in combination with capsules formed of other materials and/or capsules having the bottom wall and/or the closing wall provided with holes.

In the example, the wall or the foil 4 is sealingly connected to the side wall 3a of the body 3, for example, by heat sealing, particularly at an external annular flange 3c thereof, which surrounds the mouth part of the body 3: the capsule 1 therefore has an asymmetrical shape with respect to a plane extending through the flange 3c.

In the case exemplified, the body 3 has a cup or bowl shape diverging from the bottom wall 3b towards the end closed by the sealing foil 4. Preferably, this diverging conformation is a truncated-cone shape, although not mandatory, since the capsule 1 can present different overall forms, for example cylindrical, prismatic, pyramidal, hemispherical, etc. In the non-limiting example shown, the bottom wall 3b has a concave conformation, with the concavity of this part directed towards the outside of the capsule 1. Again, the choice of this conformation is not mandatory in nature, since the capsule 1 could have—for example—a bottom wall 3b with the concavity facing towards the inside of the capsule 1, or a flat or essentially flat bottom wall 3b.

Figure 3:
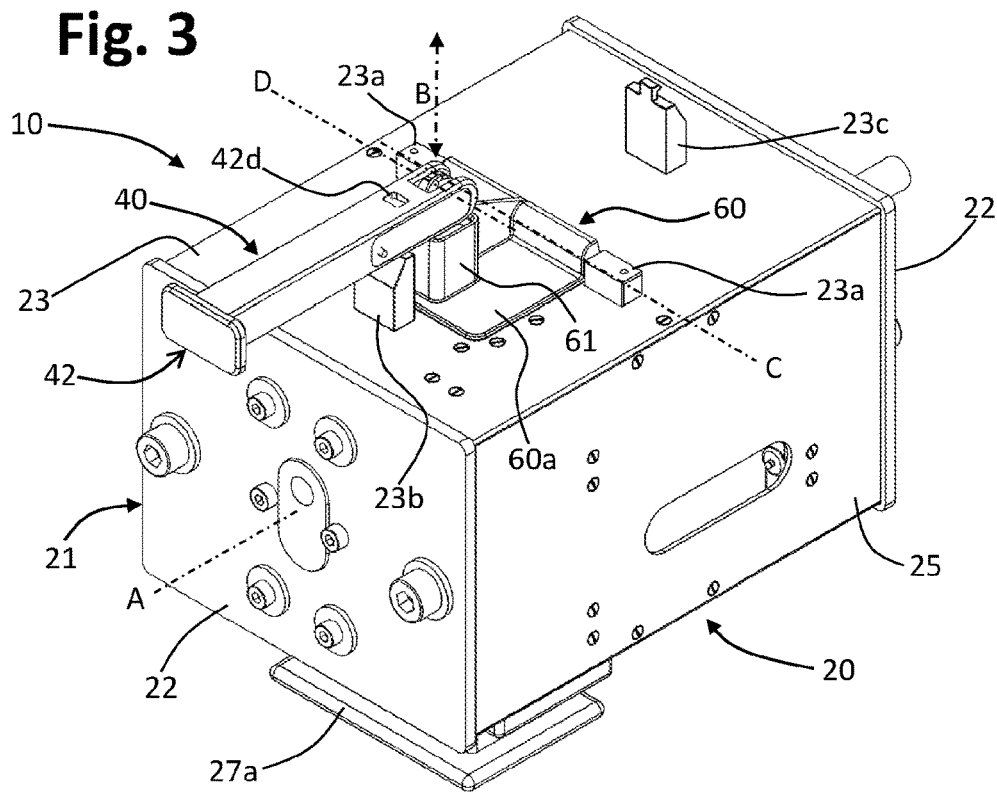
FIGS. 3 and 4 are partial and schematic perspective views of a machine for preparing liquid products in accordance with an embodiment of the invention.
Figure 4:
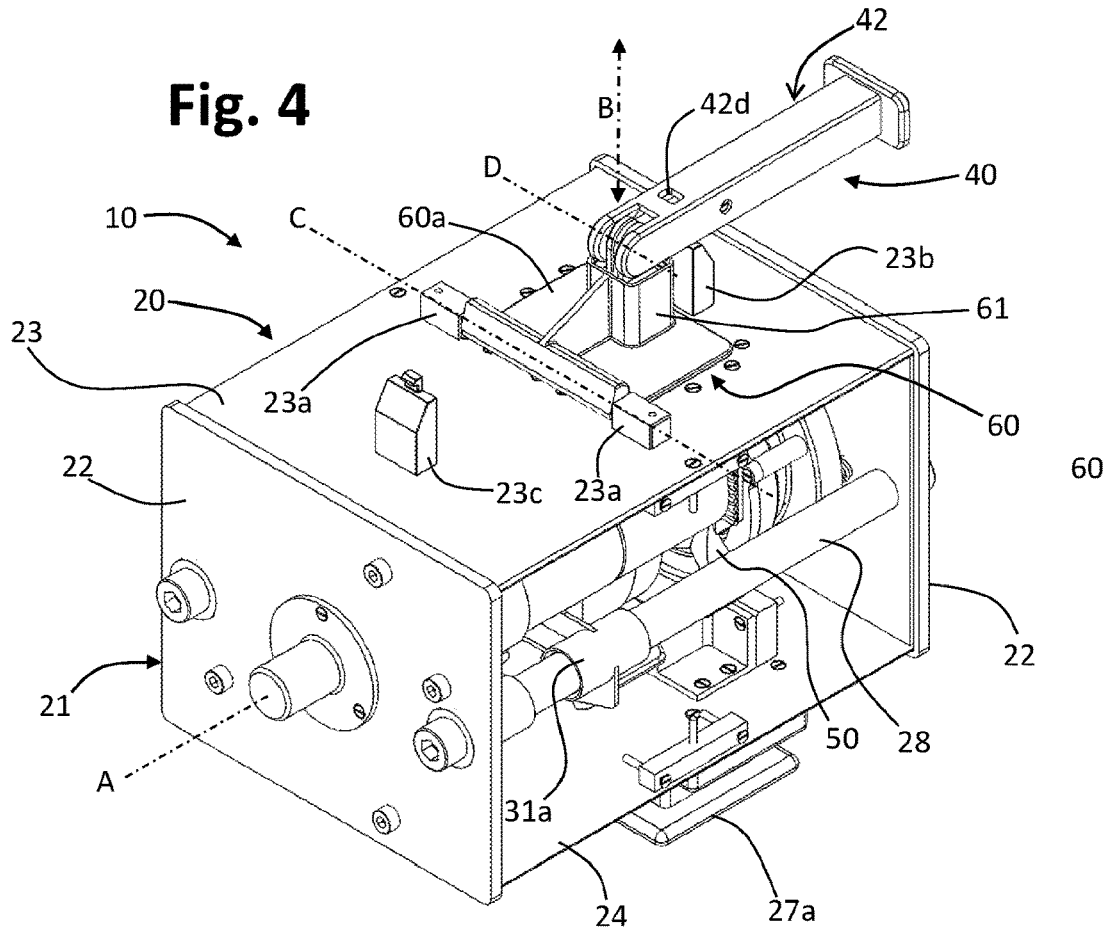
Figure 5:
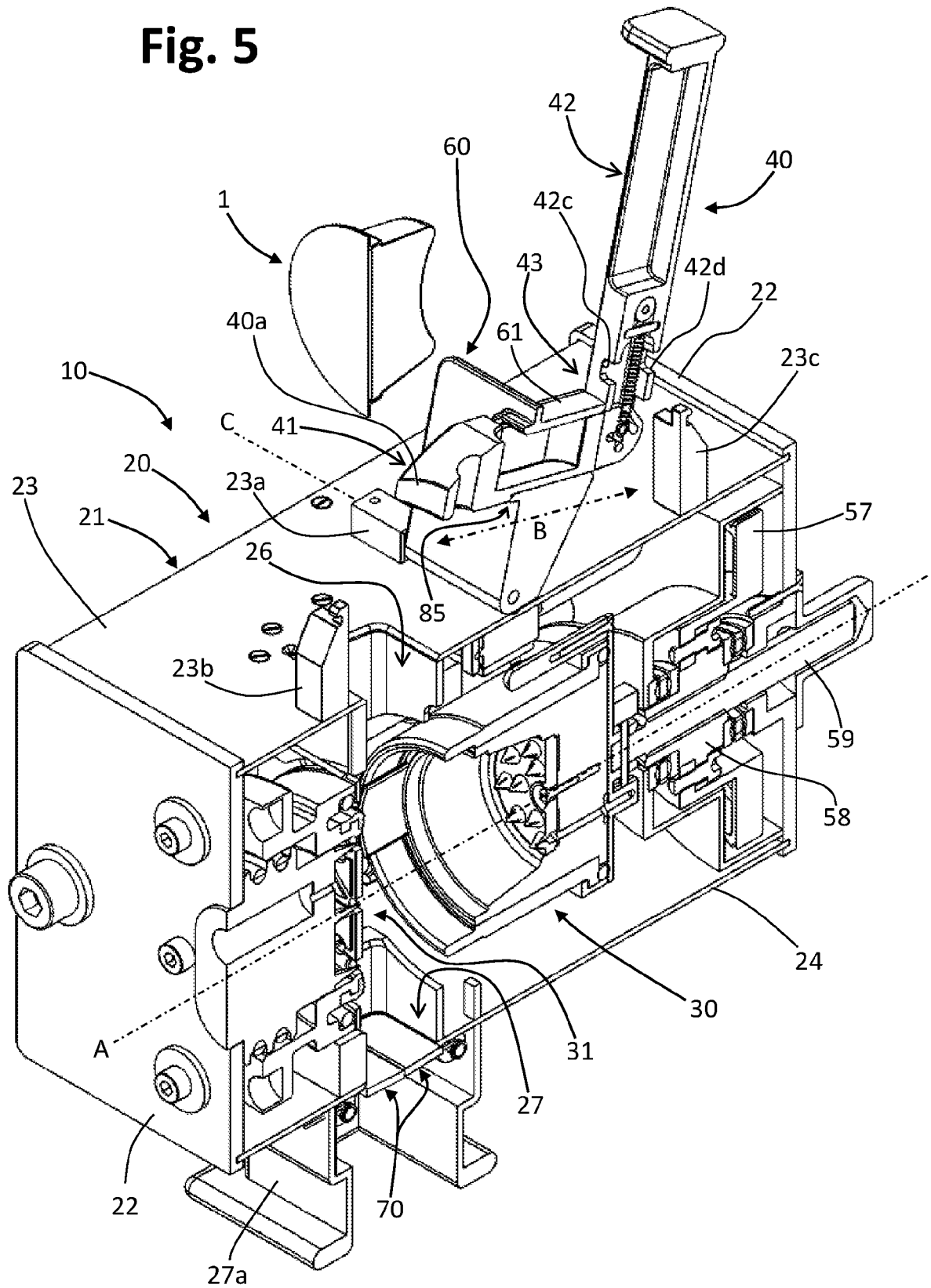
FIG. 5 is a perspective view, in longitudinal section, of a machine for preparing liquid products in accordance with an embodiment of the invention.

FIGS. 3, 4 and 5 represent, in schematic form, and merely for exemplative and non-limiting purposes, a machine 10 for preparing liquid products, employing a dispensing assembly according to an embodiment of the invention, suitable for using a capsule, for example, a capsule 1 of the type described above with reference to FIGS. 1 and 2.

The machine 10 is illustrated here limited to the parts of interest for understanding the invention, essentially represented by the dispensing assembly indicated as a whole by 20. In the figures, other functional components normally provided in a machine of the type considered here are therefore not highlighted, such as a fitting for connecting a water source (for example, a reservoir), a pump, a boiler, a user interface, an electronic control board, a nozzle for dispensing the liquid product, etc.

In various embodiments, the dispensing assembly 20 has a support structure or casing 21, for example comprising two end heads 22, an upper wall 23, a lower wall 24 and two side walls 25 (in FIG. 4 the representation of a side wall 25 has been omitted). The terms "upper", "lower" and "side", when referring to the walls of the casing 21, are to be understood as simply referring to the position illustrated in the figures given that, as will become apparent below, the assembly 20 according to the invention is capable of operating in a plurality of possible alternative orientations.

As particularly visible in FIG. 5, an infusion chamber is located inside the casing 21, comprising a first part 30 and a second part 31, of which at least one is movable relative to the other. The first part 30 includes a capsule-holder, defining a chamber suitable for housing a capsule 1, at least partially, and to dispense the liquid product obtained by means of the same. The capsule-holder 30, essentially coaxial with the axis indicated by A, here comprises a cup-shaped body, movably mounted with respect to the casing 21. The second part 31 of the infusion chamber of the illustrated assembly 20 comprises an injector device, hereinafter referred to by "injector" for simplicity, suitable for introducing water and/or steam under pressure into a capsule 1, fed by a respective duct, by means of a water source (for example a reservoir), a pump and a boiler, not shown. In the illustrated example, the injector 31 is essentially coaxial to the axis A and preferably, but not necessarily, mounted in a stationary position with respect to the casing 21. In embodiments not shown, the injector 31 can be movable, in order to approach the injector itself and the capsule-holder 30 to each other. A unidirectional valve (not shown) is preferably associated with the injector 31, configured to open only when the pressure inside the relative feed duct has reached a determined value; such a valve can be integrated within the injector 31 or can be arranged externally to it. In possible variant embodiments not shown, the function of injection of the fluid in the capsule 1 can be implemented in the first part 30 of the infusion chamber, and the function of dispensing of the liquid product implemented in the second part 31 of the infusion chamber.

The assembly 20 includes an arrangement for the loading and unloading of a capsule 10, which comprises an inlet passage and an outlet passage, indicated by 26 and 27 in FIG. 5, defined here in positions essentially aligned with each other in the upper wall 23 and in the lower wall 24, respectively. The loading and unloading arrangement also includes retention means. In one embodiment, the aforesaid retention means are capable of assuming at least one retaining condition and at least one releasing condition of a capsule 1: in this case, as will become clear below, a switching of the said retention means between the mentioned conditions is preferably obtainable both by a relative movement between the capsule-holder 30 and the injector 31, and by means of a longitudinally extended pusher member, indicated by 40 and described hereinafter. Preferably, the retention means are arranged within the casing in an intermediate position between the inlet passage 26 and the outlet passage 27, to be operational between the capsule-holder 30 and the injector 31 when these are in their spaced-apart position.

Figure 6:
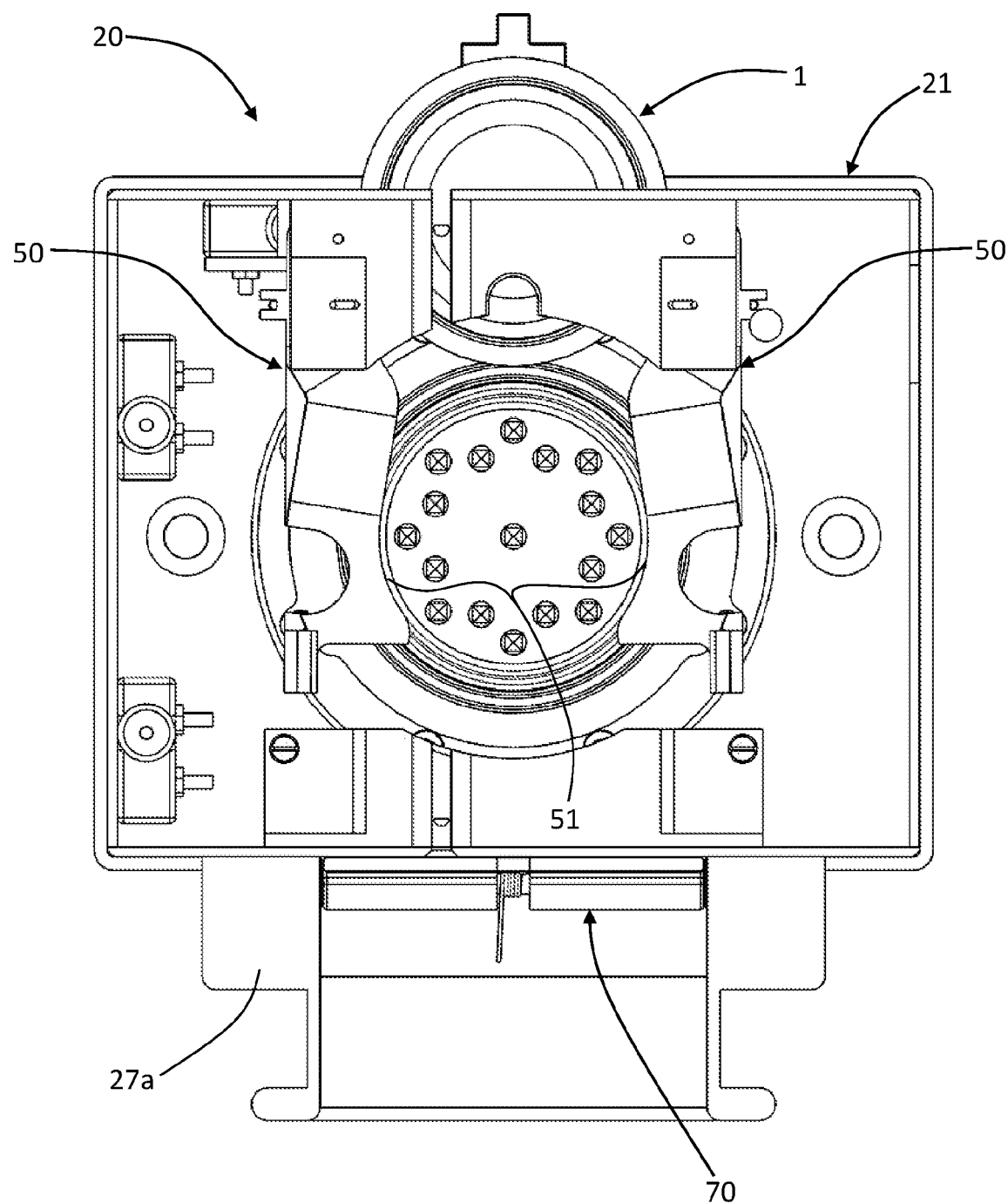
FIG. 6 is a schematic cross-section of the machine of FIG. 5.

With reference also to FIG. 6, in one embodiment, the aforesaid retention means comprise a stationary gripper device, which includes two jaw elements 50, hereinafter defined "jaws" for simplicity. Preferably, the jaws are essentially mounted symmetrically on opposite sides of the axis A, essentially in one and the same transverse plane. In the case exemplified, the jaws 50 extend lengthways, essentially perpendicular to the axis A, and are articulated by means of at least one pin, not visible, here parallel to axis A and integral with the casing 21 or with the body of the injector 31. The jaws 50 can be provided with springs or similar elastic means, not visible, for example mounted at the relative hinge pins, arranged to push the jaws themselves towards an equilibrium position, shown in FIG. 6, particularly a position for retaining a capsule 1; in other embodiments, the aforesaid position is obtained without the aid of dedicated springs and the intrinsic elasticity of the material forming the jaws—for example a plastic material—is exploited to enable them to spread apart. In the non-limiting depicted example, the jaws 50 are articulated in their upper region, but of course they can be articulated in other regions, for example in the lower region. In a preferred embodiment, the jaws 50 are shaped so as to define a seat between them, indicated by 51 in FIG. 6, particularly an essentially cylindrical seat, preferably essentially coaxial to the axis A. The non-limiting arrangement exemplified is such so that, during the step of loading from above, a preferably cylindrical part of the capsule 1, behind the annular flange 3c (see, for example, FIG. 2), creeps in between the jaws 50, causing them to spread apart against the action of the corresponding springs (or against the intrinsic elasticity of the material forming the jaws), until reaching the seat 51. In this condition, the capsule 1 is held elastically by the jaws 50, in a position essentially coaxial to the axis A and intermediate to the injector 31 and the capsule-holder 30. In other embodiments not shown, the seat 51 and the jaws 50 can be arranged so that achieving and maintaining the aforesaid position by the capsule 1 is carried out in the absence of an elastic stress on the jaws themselves: in such a case, the presence of any elastic means and/or the intrinsic elasticity of the material forming the jaws 50 is exploited to enable them to spread apart and their subsequent return to the equilibrium position.

The body of each jaw 50 is shaped—particularly at its part facing the capsule-holder 30—in such a way so as to interact with parts of the capsule-holder 30, in order to achieve spreading apart of the jaws themselves: for this purpose, for example, the body of the jaws 50 can be provided with corresponding flarings or inclined planes, or have projections which cooperate with corresponding parts, such as flarings or inclined planes, present on the capsule-holder 30.

The retention means of the assembly 20 according to the invention can also have a different conformation from the one exemplified, without prejudice to the general functionality of retaining a capsule 1 in an intermediate position, essentially coaxial with the capsule-holder 30 and the injector 31. For example, in an embodiment not represented, the retention means comprise guide elements engageable by the flange 3c of a capsule, suitable for supporting the flange in the aforesaid intermediate position; after the capsule has been taken over by the capsule-holder 30, during the approach of the capsule-holder to the injector 31, the possibility of deforming the flange 3c is exploited, in order to free it from the aforesaid guide elements. The retention means could also be carried directly by the capsule-holder 30 or by the injector 31, for example in the form of jaws or projecting arms, configured to spread apart following the interaction with the body of the injector 31 or the capsule-holder, respectively. Furthermore, the retaining position of the capsule 1 by the retention means need not necessarily be coaxial with the axis A. In this intermediate position, in fact, the axis of the capsule 1 could also be parallel or slightly inclined with respect to the axis A: in such variant embodiment, the conicity of the peripheral wall of the capsule 1 and the chamber defined in the capsule-holder 30 can be exploited, to obtain a relative movement of centering between the elements in question, during advancing of the capsule-holder, as clarified below.

In its upper wall 23, the casing 21 has the aforesaid passage 26 for introducing the capsules 1. Preferably, the profile of the passage 26 essentially conforms to the section of the capsules 1, so as to allow a guided introduction with relative precision into the assembly 20. In this perspective, for example, the opening 26 preferably defines opposite guide grooves for the flange 3c of the capsule 1, one of which is visible, for example, in FIG. 17, where it is indicated by 26a. During loading, after having passed the opening 26, the capsule 1 is loaded by the jaws 50 (FIG. 6).

The assembly 20 includes two opposite linear guides, one of which is indicated by 28 in FIG. 4, here formed by a cylindrical rod. In the two guides 28, parallel to each other and with respect to the axis A, respective lateral guide elements of the capsule-holder 30 are engaged, one of these elements being indicated by 31a in FIG. 4. As already indicated, the capsule-holder 30 then has parts or elements configured to cause spreading apart of the jaws 50 during its advancement towards the injector. In one embodiment, for example, two front elements of the capsule-holder 31 (not shown in the figures) are provided for the purpose, opposite to each other and each defining at least one respective inclined plane. The inclined planes of the aforesaid elements are configured to interact with relative flarings or inclined planes defined on each jaw 50, to cause the divergence.

The capsule-holder 30 has an essentially cup-shaped body, defining the corresponding housing for the capsule. To this end, the cup-shaped body has a side or peripheral wall, which defines an inner surface of the housing which has essentially a truncated-cone shape, or another shape congruent to that of the side wall of the capsules employed. The cup-shaped body of the capsule-holder 30 has a bottom wall and a discharge passage, not visible in the figures, which places the inside of the housing in fluid communication with a duct connected to a dispensing nozzle (not shown) of the liquid product.

A perforating device can be associated with the bottom wall of the capsule-holder 30, within the housing and comprising one or more points or projections, as visible for example in FIG. 5. Regardless of the specific conformation of such a device, the arrangement is such so that the liquid that flows out from the capsule 1, lacerated at the bottom by the aforesaid points, can reach the aforesaid duct. The latter can be connected, for example, via a flexible tube or a rigid coupling with conjugate profiles, to the nozzle for dispensing the liquid product.

The invention is also applicable to the case of dispensing assemblies for capsules having one or more pre-perforated end walls, or for capsules in filter-paper, in which case it is not necessary to provide a perforating device in the capsule-holder 30 and/or, or in the injector 31.

Figure 7:
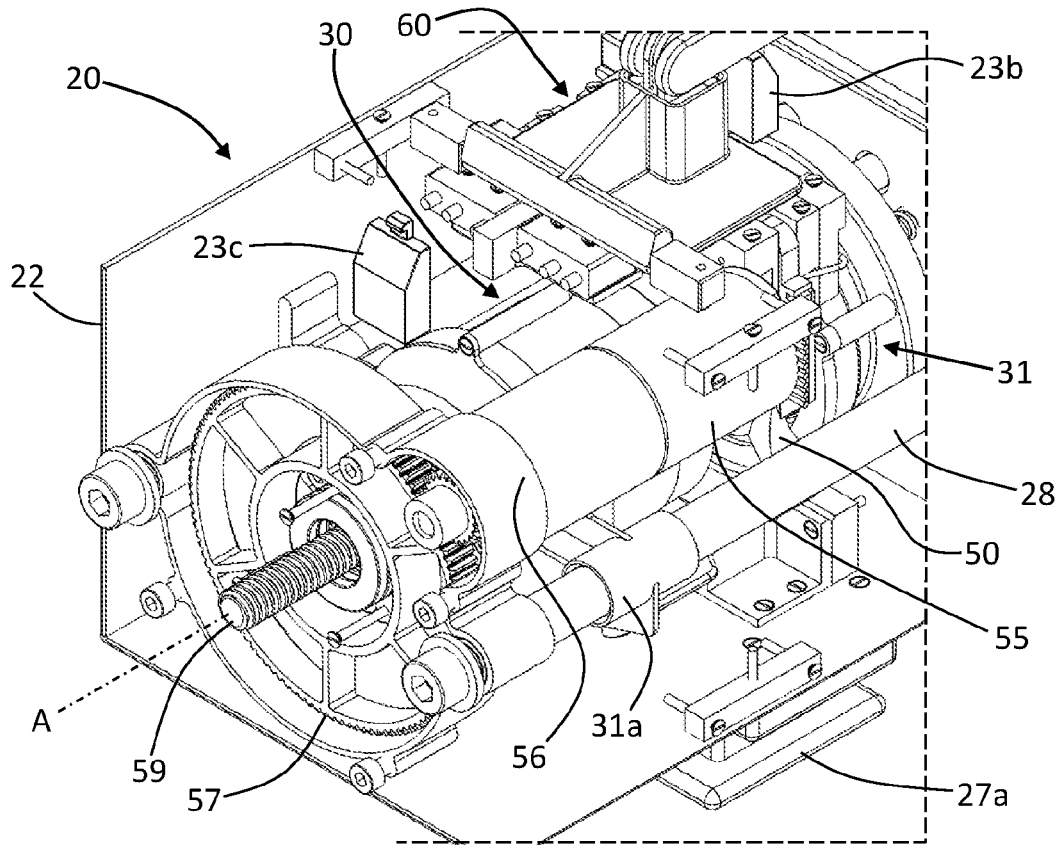
FIG. 7 is a partial and schematic perspective view of a dispensing assembly of a machine according to an embodiment of the invention.

In the embodiment exemplified, the capsule-holder 30 is movable in two opposite directions along a drive axis, here represented by the axis A, through an actuation system. In a preferred embodiment, the actuation system includes an electric actuator, particularly a bidirectional electrical motor, indicated by 55 in FIG. 7 (in which the representation of the upper wall 23, a head 22 and a side wall 25 is omitted). In the illustrated example, a gearmotor 56 is associated with the motor 55, in which an outlet gear is engaged with a gear wheel 57. As is shown in FIG. 5, the gear wheel is integral in rotation with a lead nut 58, in which a threaded rod 59 is engaged, integral with the bottom of the capsule-holder 30 and coaxial with the axis A.

Starting from the retracted position of the capsule-holder 30, visible for example in FIG. 5, driving of the motor 55 in a first direction causes, by means of the gearmotor 56, rotation of the gear wheel 57, and therefore of the lead nut 58. The capsule-holder 30 is constrained laterally to the guide rods 28 and it is connected with the threaded rod 59: the rotation of the lead nut 58 then causes the progressive advancing of the capsule-holder 30 towards the injector 31, up to their close position, detectable for example by a suitable sensor, such as a micro-switch. Causing a subsequent reverse rotation of the motor 55, and thus of the rod 59, it is possible to obtain an opposite displacement, or a retraction of the capsule-holder 30, away from the injector 31, to the respective spaced-apart position of FIG. 5. Of course, alternative embodiments of the actuation system of the assembly 20 are possible, possibly based on a manual-type drive, according to techniques known per se.

According to a feature of the invention, the assembly 20 comprises a guide member, defining a respective through-guide and mounted at the inlet opening 26 to be movable between an inoperative position and an operative position, in which access to the inlet opening 26 is allowed or prevented, respectively.

In the illustrated embodiment, the aforesaid guide member is indicated by 60, for example in FIGS. 3-5, and provides in essence a closing element of the inlet passage 26: for this reason, the member 60 will also be identified below as lid; in the example shown, the through-guide 61 of the member 60 comprises a tubular part which raises from an essentially flat base 60a (FIGS. 3-4) of the same member.

According to an additional feature of the invention, the assembly 20 comprises a pusher member 40, hereinafter also referred to as "pusher" for simplicity, which is slidably engaged in the guide of the lid 60, to be movable according to a respective sliding axis between a first position and a second position, this sliding axis being generally transverse to the actuation axis A when the lid 60 is in the operative position. The sliding axis of the pusher 40 in the guide 61 is indicated by B in FIGS. 3-5. As will become clear below, with the lid 60 in its operative position and with the capsule-holder 30 and the injector 31 in their spaced-apart position, a displacement of the pusher 40 from the first position to the second position is such as to cause a thrust on the capsule 1, with the consequent switching of the retention means, here represented by the jaws 50, from their retaining position to their releasing position. In a preferred embodiment, the pusher 40 has such a length so as to push the capsule beyond the jaws 50 as well, i.e., push it through the outlet passage 27.

In one embodiment, the lid 60 is hinged to rotate about an axis, indicated by C in the figures, which is generally transverse to the sliding axis B of the pusher 40. In the illustrated example, for this purpose, the upper wall 23 of the casing 21 has two fixed hinge elements 23a, for engaging a pivot pin of the lid 60, not shown.

In a preferred embodiment, the pusher 40 comprises a plurality of parts connected together in an articulated manner, including at least one first part, with a head end capable of coming into contact with a capsule 1, and one second part, including at least one rear portion operable by a user, for example, to cause the sliding of the pusher 40 between the aforesaid first and second positions. The two aforesaid parts, indicated by 41 and 42 in the figures, are articulated in such a way that the second part 42 is angularly movable about an axis D which is generally transverse to the sliding axis B.

In one embodiment, the pusher 40 therefore has at least one articulation, indicated by 43 in the figures, which is intermediate to the parts 41 and 42. Preferably, this articulation 43 comprises a kinematic arrangement arranged to define a first predefined or stable angular position between the parts 41 and 42 of the pusher 40, in which they are essentially aligned with each other according to the sliding axis B. In a preferred embodiment, the kinematic arrangement associated with the articulation 43 is arranged to define at least one second predefined or stable angular position between the parts 41 and 42 of the pusher 40, in which they are essentially arranged transversely to each other, particularly essentially perpendicular to each other.

Figure 8:
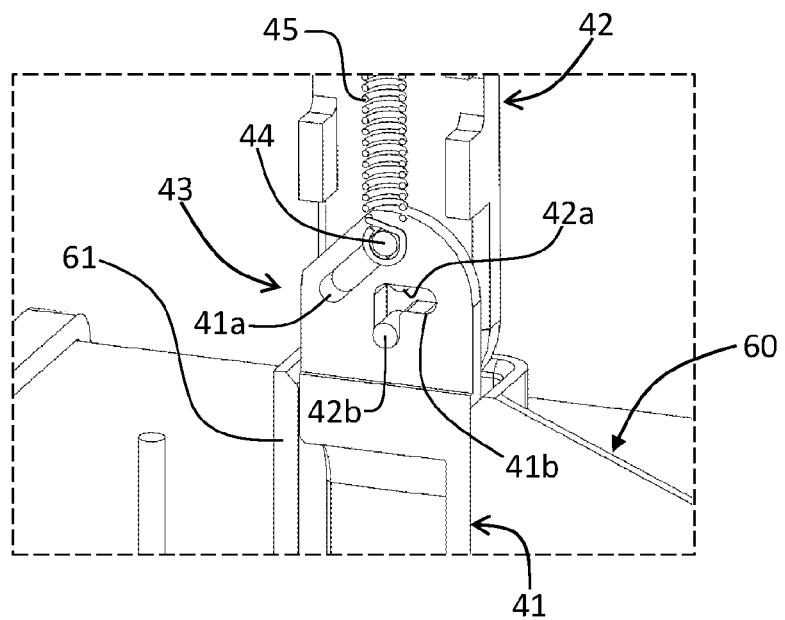
FIGS. 8-14 are schematic partially cross-sectioned views, of a joint of a pusher member of a machine according to an embodiment of the invention, in different conditions.

One possible embodiment of the articulation 43 with the associated kinematic arrangement is represented in FIG. 8, in which the articulation itself is in the aforesaid first predefined or stable angular position. The articulation 43 includes a first pin 44, inserted idle between two recesses 41a and 42a, defined respectively in the parts 41 and 42 of the pusher. The recess 41a extends obliquely in the part 41, with respect to the axis of the latter, while the recess 42a extends in the axial direction of the part 42. The first end of a spring 45 is associated with the pin 44, here of helical-type, whose other end is connected to the part 42, by means of a suitable stop, visible for example in FIG. 10, where it is indicated by 46. The part 41 also defines a second recess 41b, with an inverted-L profile, or having a horizontal upper portion and a vertical lower portion, essentially aligned with the upper end of the recess 41a. A second pin 42b, integral with the part 42, is engaged in the second recess 41b. In the condition depicted in FIG. 8, in which the idle pin 44 occupies the upper ends of the recesses 41a and 42a, the spring 45 tends to pull the part 42 of the pusher downwards, with the pin 42b then occupying the lower end of the recess 42a, at a maximum distance from the pin 44. In this condition the action of the spring 45, and the alignment of the two pins 44 and 42b in the respective recesses, allows the illustrated position to be maintained, essentially with axial alignment between the parts 41 and 42 of the pusher.

Figure 9:
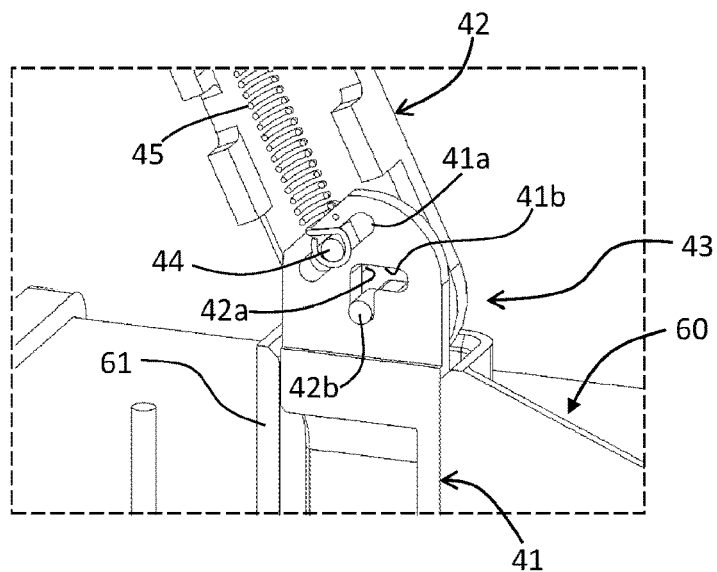
Figure 10:
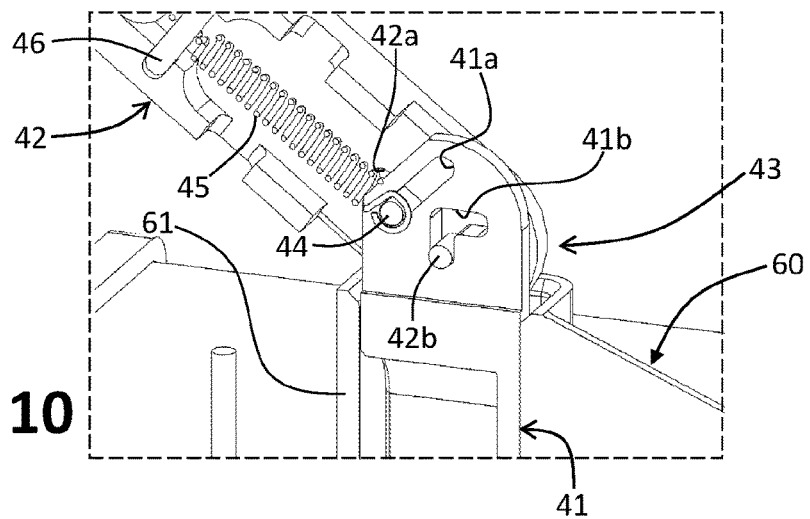
Figure 11:
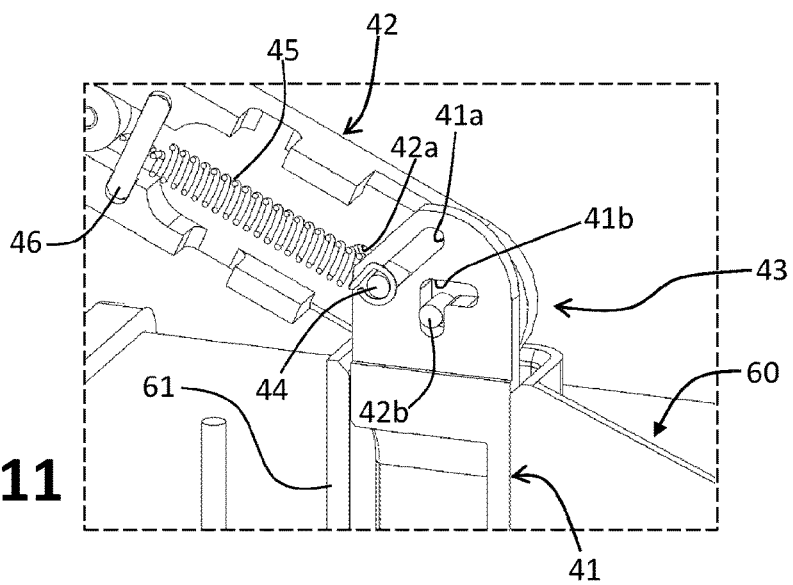
Figure 12:
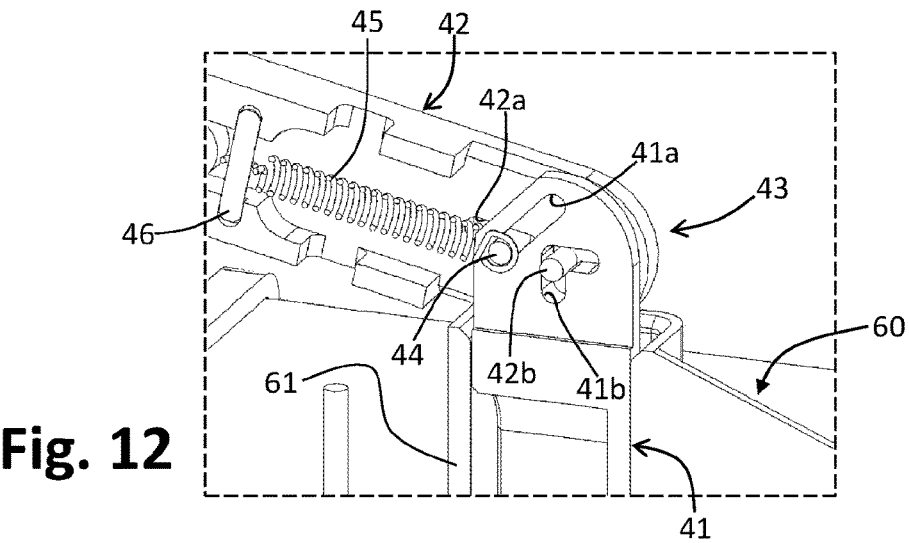
Figure 13:
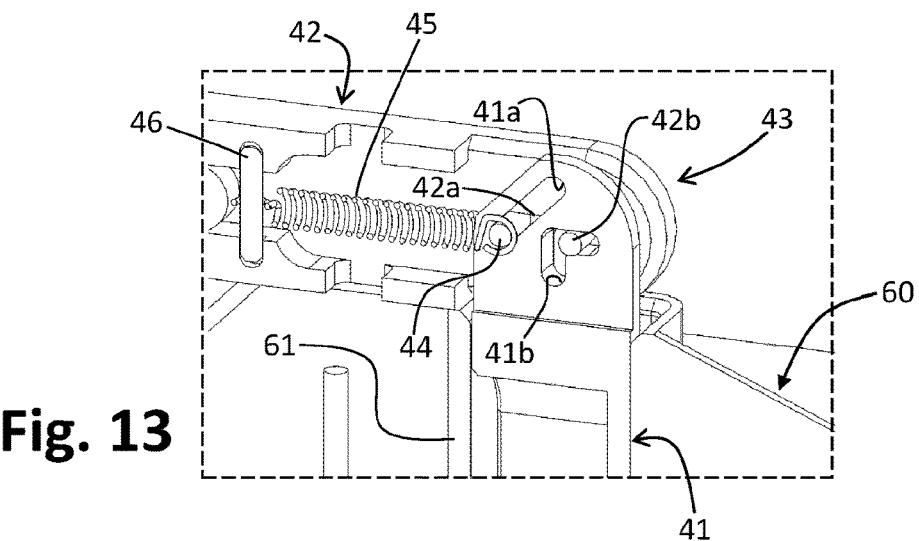
Figure 14:
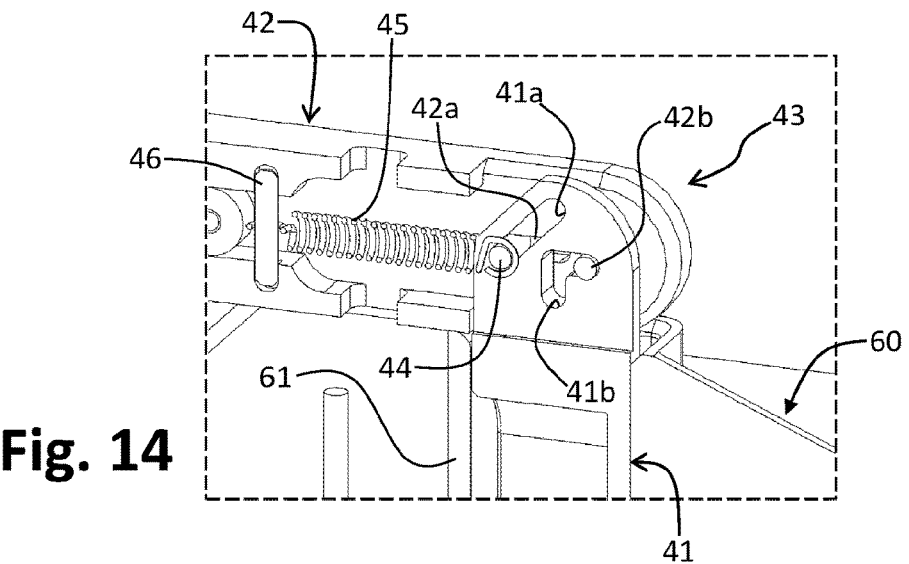

In FIG. 9, the start of an angular movement of the part 42 relative to the part 41 constrained in the guide 61 of the lid 60 is illustrated. In the example, the movement is counter-clockwise (referring to the Figure) and is imparted manually to the part 42: with such a movement the pin 44 begins to descend along the recesses 41a and 42a, with the pins 44 and 42b approaching progressively. At a certain point of the angular movement, the pin 44 reaches the lower bottom of the recess 41a, as illustrated in FIG. 10; the continuation of the angular movement of the part 42 then causes the progressive raising of the pin 42b within the vertical part of the recess 41b of the part 41, as visible for example in FIGS. 11 and 12. When the pin 42b reaches the horizontal part of the recess 41b, the pin 44 occupies the upper end of the recess 41a, as in FIG. 13, and the spring 45 pulls the part 42 of the pusher towards the right (with reference to the figures), so that the pin 42b reaches the bottom of the horizontal portion of the recess 41b, as in FIG. 14, again with a maximum distance between the two pins, into the aforesaid second predefined or stable angular position between the parts 41 and 42. Even in this condition, the action of the spring 45 and the alignment of the two pins 44 and 42b in the respective recesses allows the illustrated position to be maintained, in which the parts 41 and 42 of the pusher are essentially perpendicular to each other. This relative position between the parts corresponds to that seen, for example, in FIGS. 3-5.

It can be appreciated, therefore, that, in one embodiment, the axis of rotation D between the two parts 41 and 42 of the pusher 42 is a translatable axis. It can also be appreciated that the articulation 43 and the bistable kinematic arrangement provided between the parts 41 and 42, although not essential for the purposes of implementing the invention, can be of any known type other than that represented.

In a preferred embodiment, the dispensing assembly 20 comprises at least one closing member, mounted at the outlet opening 27 to be movable between a closed position and an open position, the at least one closing member being elastically urged towards the closed position.

Figure 15:
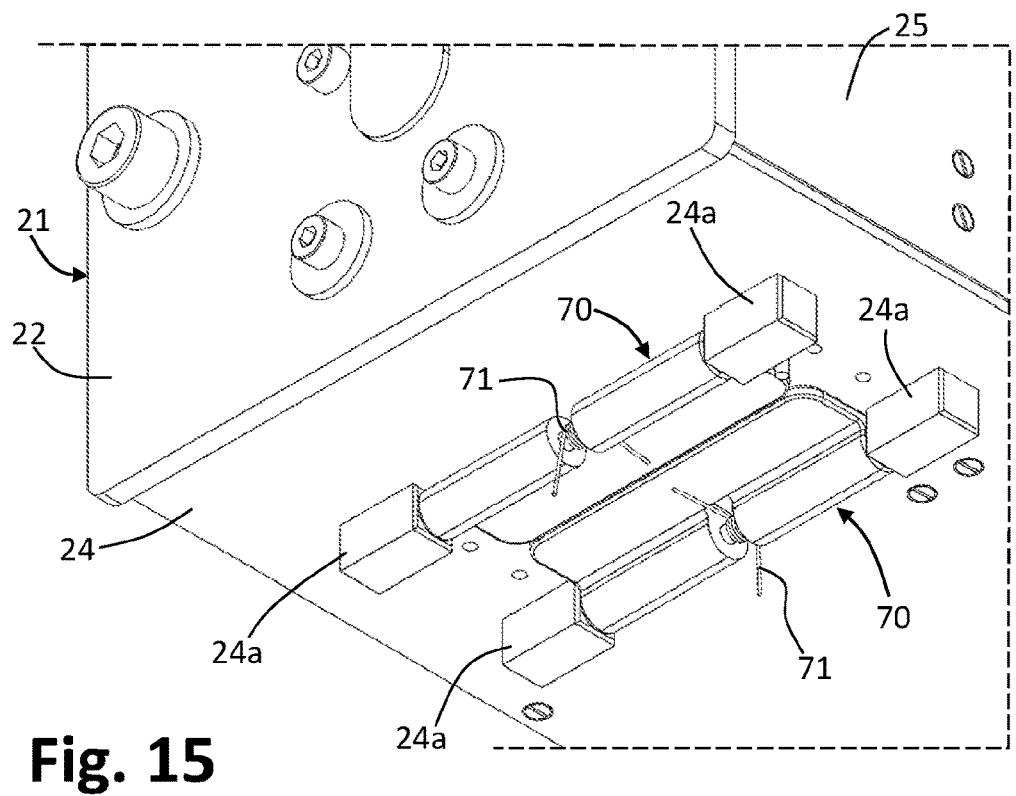
FIGS. 15 and 16 are partial and schematic perspective views of a first portion of a dispensing assembly in accordance with an embodiment of the invention.
Figure 16:
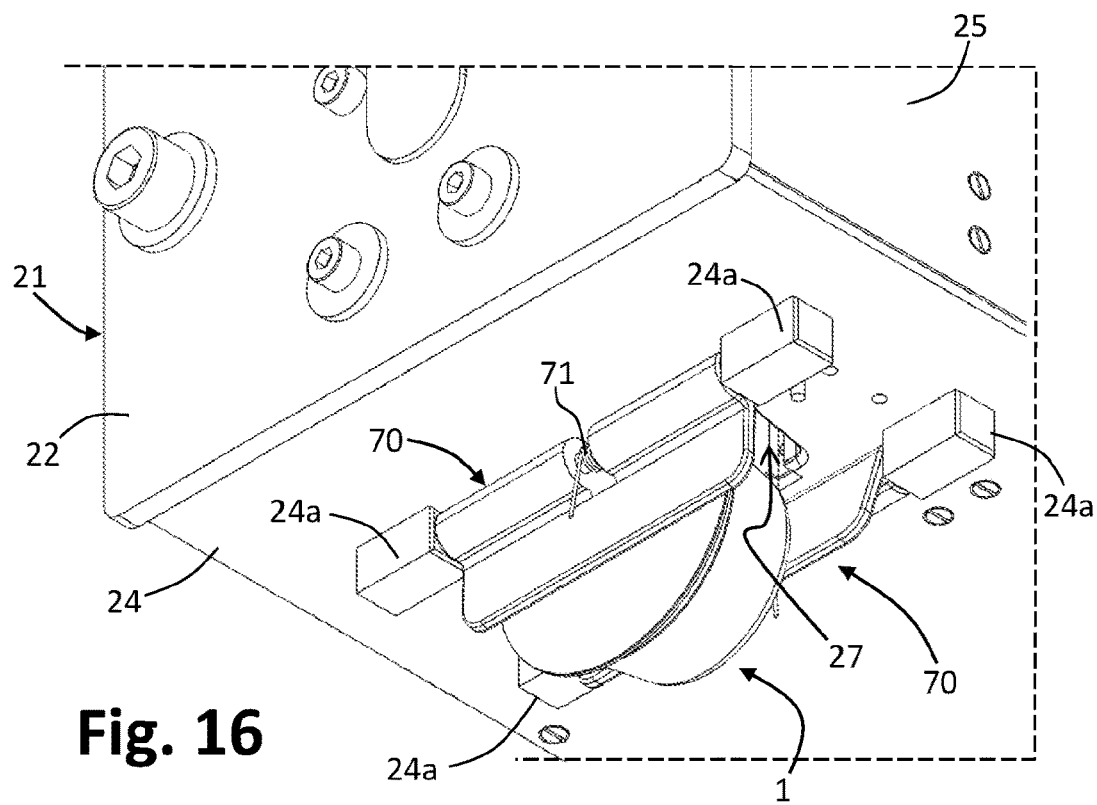

In an embodiment, such as that shown in FIG. 5, two flap elements are provided for this purpose, indicated by 70 and also clearly visible, for example, in FIGS. 15 and 16. The two flap elements 70 are mounted in opposite positions at the outlet opening 27, to be movable between a respective closed position and an open position. In the example, the elements 70 are mounted to rotate about an axis generally transverse to the sliding axis B of the pusher, when the lid 60 is in the operative position, i.e., when it closes the inlet opening 26.

Preferably, each flap element 70 is elastically urged towards the closed position: in the illustrated example, a torsion spring 71 is associated with each flap element 70, here fitted on the corresponding pivot pin and interacting between the body of the respective element 70 and the bottom wall 24 of the casing 21; in the example, the wall 24 also has fixed hinge elements 24a. FIG. 15 illustrates the closed position of the flap elements 70, while FIG. 16 illustrates the open position thereof. As will become clear below, a thrust exerted on a capsule 1 by means of the pusher 40 causes the elements 70 to pass from the closed position to the open position, in order to enable the unloading of a used capsule from the assembly: FIG. 16 precisely illustrates the step in which the flap elements 70 are carried to the opening position, against the action of the respective springs 71, by the capsule 1 which is pushed by the pusher 40 to the outside of the assembly 20. As said, the length of the pusher 70 is such so that the thrust exerted by it on the capsule 1 continues until achieving the complete exit from the outlet passage 27, and hence causing the flap elements 70 to pass into their open position.

Preferably, but not necessarily, a tubular duct 27a is also associated with the lower wall 24, which constitutes a sort of extension of the outlet passage 27. The duct 27a can be advantageously configured for hooking a container for collecting used capsules, which can also be a flexible container, such as a bag or the like.

In one embodiment, the assembly 20 comprises stop means, for retaining the pusher 40 in a stationary position when the lid 60 is in at least one of its operative position or its inoperative position.

In the example shown, the upper wall 23 of the casing 21 has an element 23b provided at the upper end with a hooking tooth, not shown, which is capable of engaging in a corresponding seat defined in the part 42 of the pusher 40, partially visible in FIG. 5, where it is indicated by 42c. The aforesaid tooth is capable of elastically engaging in the seat 42c when the parts 41 and 42 of the pusher 40 are in the respective stable angled position and the part 42 is pushed down on the tooth itself: the engaged condition is visible, for example, in FIGS. 2 and 3, corresponding to the closed or operative position of the lid 60. An upward traction of the part 42 then causes the release of the seat 42c from the tooth of the element 23b.

Preferably, but not necessarily, a second element 23c is also provided, for example of a construction similar to the element 23b and in a position diametrically opposite to the latter, with respect to the inlet opening 26. In such an embodiment, the part 42 of the pusher 40 is provided with a second hooking seat 42d, visible for example in FIGS. 3 and 4, analogous to the seat 42c but in the opposite position on the part 42. The element 23c and the seat 42d are usable if necessary to retain the pusher 40 in position, when the lid 60 is in its inoperative or open condition.

In one embodiment, the assembly 20 comprises restraint means, arranged to temporarily retain a capsule 1 in an intermediate position between the inlet opening 26 and the retention means represented here by the jaws 50.

Figure 17:
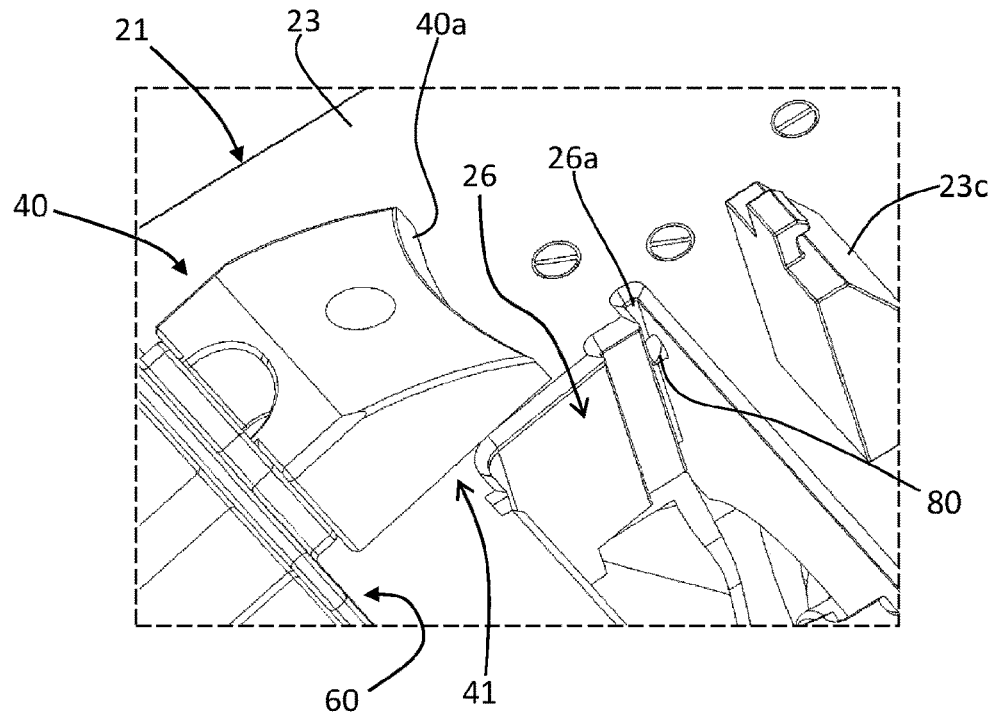
FIG. 17 is a partial and schematic perspective view of a second portion of a dispensing assembly in accordance with an embodiment of the invention.

One embodiment example in this sense is visible, for example, in FIG. 17, where the inlet passage 26 can be seen, preferably shaped so as conform to the section of the capsules employed, in order to also serve as an insertion guide. In the example considered, the passage 26 includes respective opposite grooves 26a (only one of which is visible), intended to receive the flange of a capsule 1 upon insertion into the assembly 20. As can be seen, at at least one groove 26a, a restraint element 80 is provided, here essentially in the form of a peg, transverse to the groove 26a and preferably provided at the top thereof with an inclined plane. The restraint element 80 protrudes from a respective hole provided in a wall of the groove 26a and is elastically urged towards the opposite wall of the same groove. In this way, as can be deduced, by pushing a capsule 1 into the inlet passage 26, the flange of the latter causes a retraction of the restraint element 80, which anyway remains constantly urged towards its advanced position, with its front end that therefore pushes the flange: in this way, also upon failing of a downward thrust on the capsule 1, this remains retained in position. Such an intermediate retaining condition is visible, for example, in FIG. 18, where it can be seen how the front of the element 80 tends to push the flange 3c of the capsule 1 towards the opposite wall of the groove 26a.

In the case exemplified, the restraint element 80 is urged by a spring 81 towards its advanced position. Advantageously, the restraint element 80 can be the probe of a mechanical sensor 82, such as a micro-switch, intended to detect the presence of a capsule 1 in the inlet passage 26. The presence of the restraint means 80 is particularly useful when the machine 10, or its assembly 20, is installed with different angles compared to those represented in the figures.

In one embodiment, the pusher member 40 is constrained to the through-guide 61 of the lid 60 in such a way that its head end is capable of exerting an initial thrust on a capsule 1 towards the outlet passage 27, following upon passage of the lid 60 from the inoperative position to the operative position.

The head end of the pusher 40 is, for example, indicated by 40a in FIG. 5 and is here defined by the part 41 of the pusher 40. In one embodiment, such as that represented, the guide 61 and the portion of the pusher 40 including its head end 40a have a stop or end-stroke arrangement, or are coupled in such a way that the aforesaid portion of the pusher cannot move back into the guide 61 beyond a given point. One possible embodiment of the stop arrangement, here including two conjugated surfaces of the pusher and the guide, is indicated by 85 in FIG. 5. As can be deduced, in this way, the portion of the pusher including the end 40a is always projecting from the guide 61: in this way, after a capsule 1 has been inserted into the inlet passage 26, when the lid 60 is carried to its operative position, the end 40a of the pusher exerts an initial thrust on the capsule 1 in the direction of the outlet opening 27. As will be seen, preferably, this initial thrust causes the passage of the capsule into the retaining position defined by the jaws 50.

One example of operation of an assembly according to the invention will now be described with reference to FIGS. 19-44 and 45-50, which are views similar to those of FIG. 5 and FIG. 6, respectively. Note that in FIGS. 19-44 reference numbers are not shown, for reasons of greater clarity: below, the numbering shown in FIG. 5 will be referred to.

Figure 19:
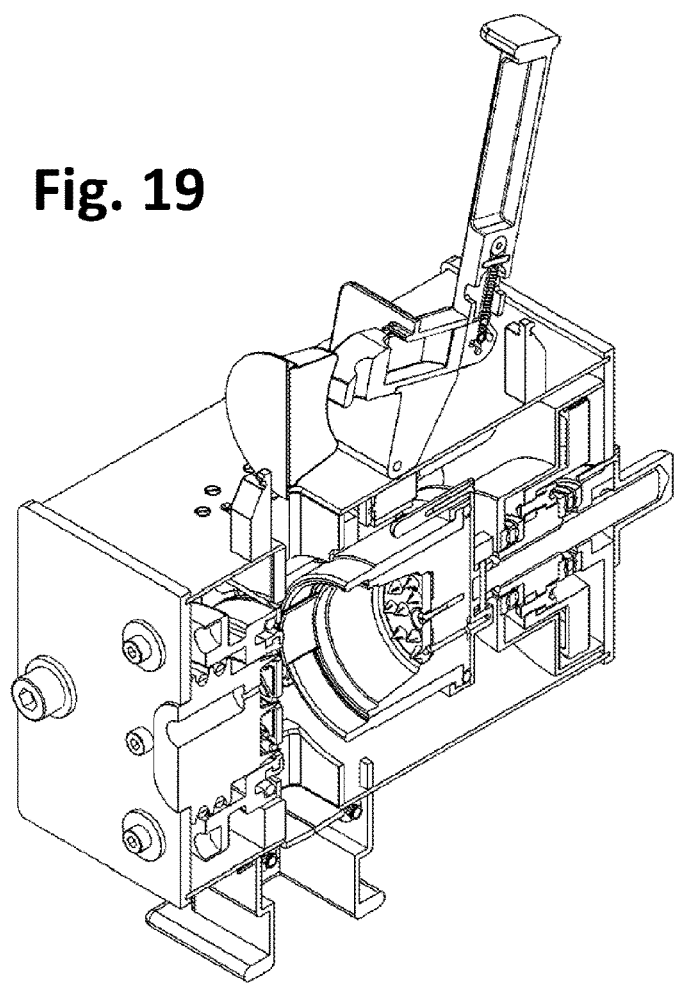

FIG. 19 is analogous to FIG. 5 and illustrates the start of the step of inserting a capsule 1 into the inlet opening 26. In this step, the lid 60 is in the inoperative position, or fully open, and the parts 41 and 42 of the pusher 40 are in the respective stable angled position (similar to that of FIG. 14). Capsule-holder 30 and injector 31 are in their respective spaced-apart position.

Figure 18:
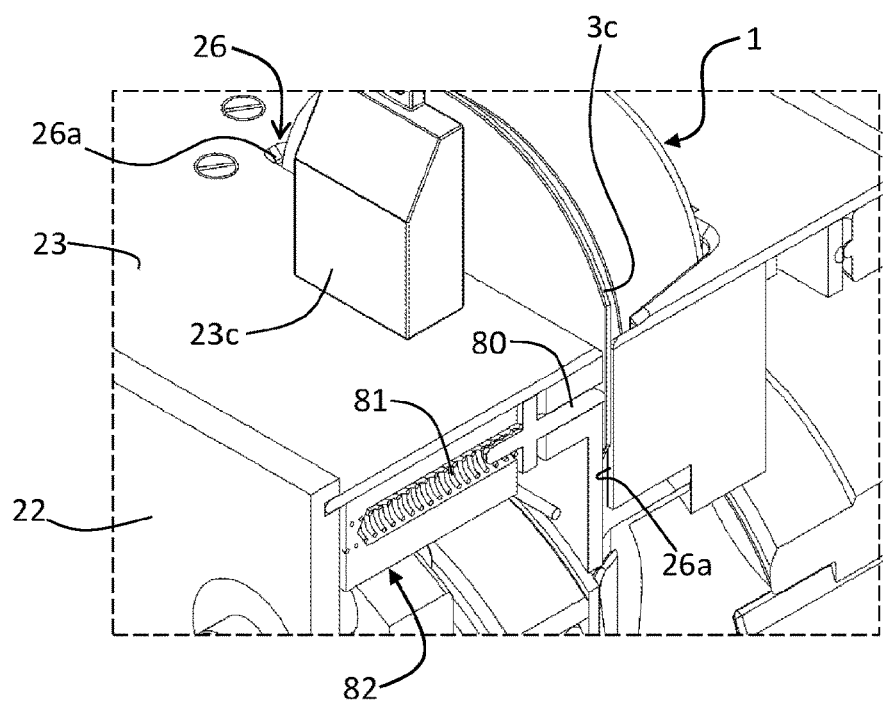
FIG. 18 is a partially cross-sectioned schematic perspective view of the portion of FIG. 17, in a different operating condition.
Figure 20:
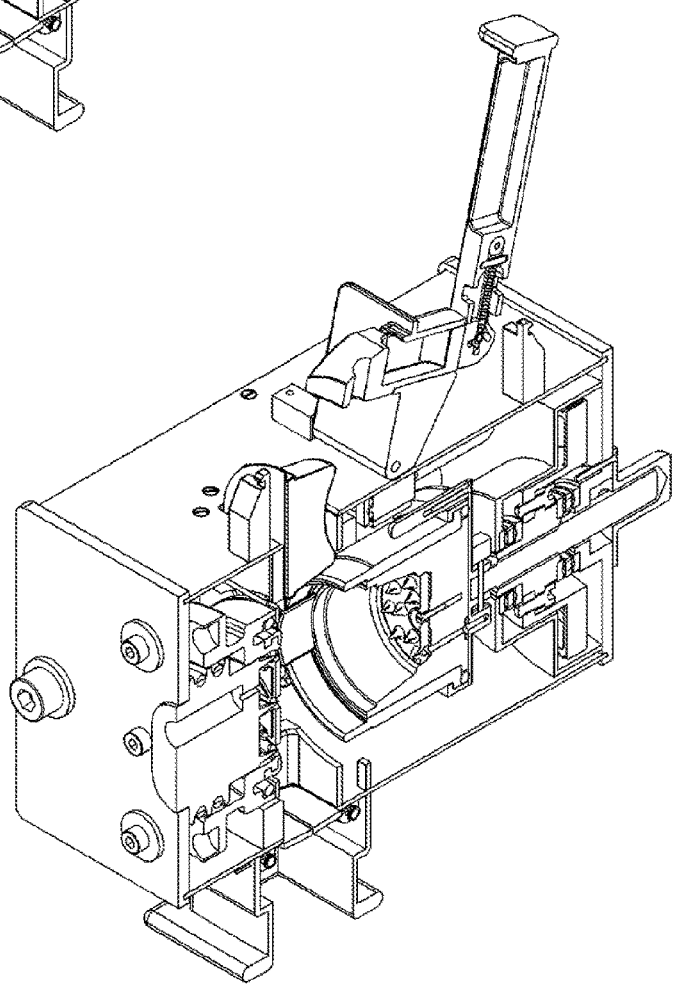

FIG. 20 shows the actual entrance of the capsule 1 into the inlet passage 26: such a condition can be assimilated to that of FIG. 18, in which the capsule is temporarily retained by the restraint element 80. The sensor 82, if provided, then detects the actual introduction of a capsule into the inlet passage 26. The condition of the jaws 50 is essentially similar to that of FIG. 6.

Figure 21:
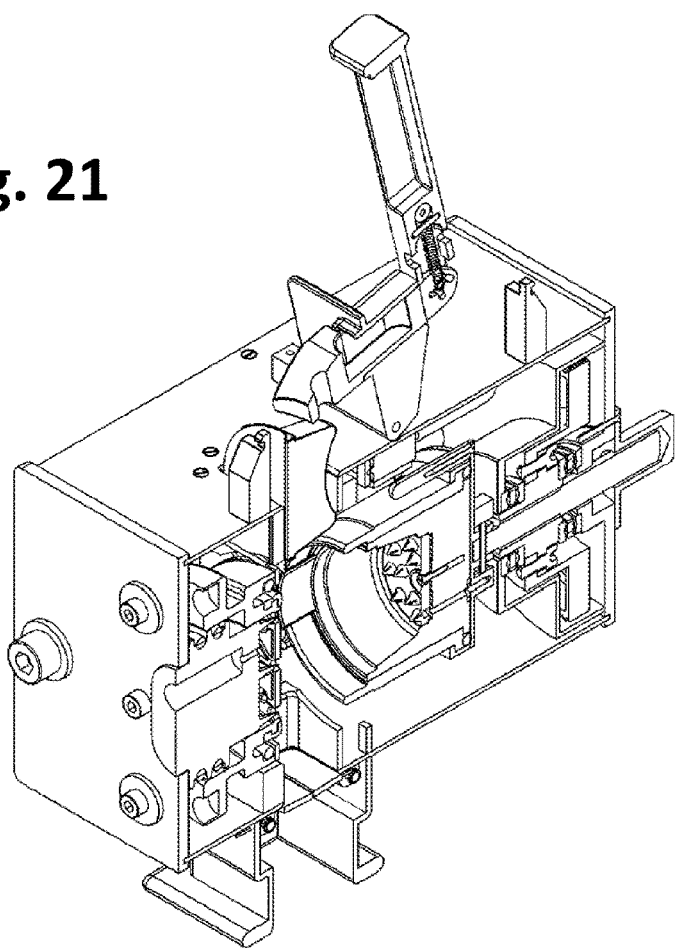

FIG. 21 shows the start of the angular movement of the lid 60 towards the operative position. This angular movement is imparted manually by acting on the pusher 40, and in particular on its part that is graspable and operable by the user, here represented by the part 42.

Figure 22:
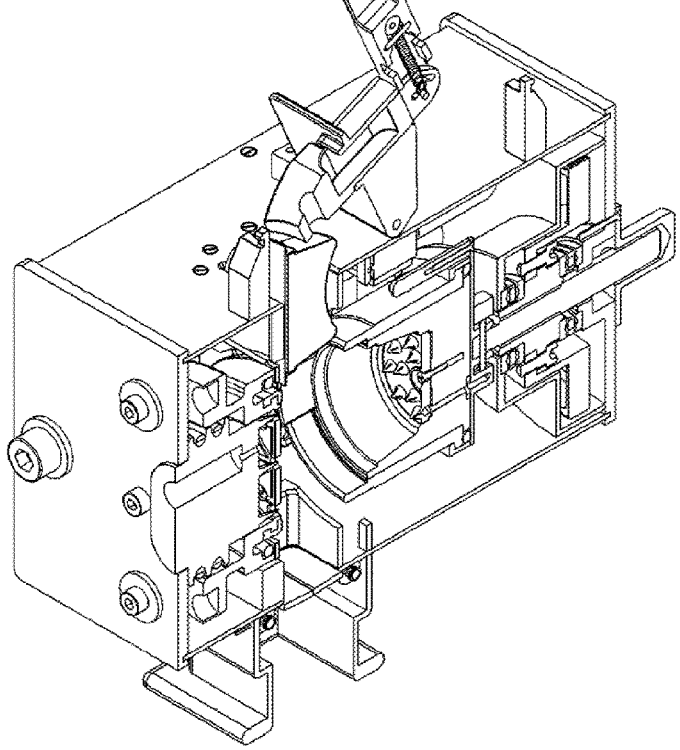

FIGS. 22-24 show the continuation of the angular movement of the lid 60, during which the head end 40a of the pusher 40 first enters into contact with the capsule 1 and then causes an initial downward thrust. This initial thrust causes the release of the capsule 1 from the restraint element 80 (FIG. 18) and its progressive engagement between the jaws 50. The corresponding condition of the jaws 50 is similar to that of FIGS. 45, 46 and 47, respectively.

The condition illustrated in FIG. 25 shows the effect of the initial thrust exerted by the head end 40d of the pusher 40, which causes the passage of the capsule 50 into the respective seat 51 (FIG. 6) defined by the jaws 50. The condition is therefore comparable to that of FIG. 48, in which the capsule is in the retaining position, in an intermediate position and essentially coaxial to the capsule-holder 30 and injector 31. Achieving this position by the capsule 1 can be possibly detected by a suitable sensor, for example a micro-switch or a proximity sensor, not shown.

FIG. 26 highlights the achievement of the operative position by the lid 60. The closing position of the lid 60 is also preferably detected by a suitable sensor, such as a micro-switch, not shown. In the condition illustrated, the part 42 of the pusher is connected to the element 23b, as previously described.

FIG. 27 shows the start of the relative movement between the capsule-holder 30 and injector 31, particularly the displacement of the first towards the second, obtained through driving the actuation system 55-59, previously described. The start of the motor 55 in the rotation direction that produces this displacement can be caused (upon the signal of the presence of a capsule generated by the sensor 82) by the switching of the sensor associated with the lid 60, or by an appropriate command given by the user on a user interface of the machine.

During its advance towards the close position with the injector 31, the front of the capsule-holder 30—or its flarings provided for this purpose—enter into contact with the jaws 50, establishing their opening: in this step, the bottom portion of the capsule 1 is already partially inserted into the housing of the capsule-holder 30, as shown in FIG. 27. At the time of complete opening of the jaws 50, the capsule 1 is therefore completely taken over by the capsule-holder 30.

FIGS. 28 and 29 show the contact between the front of the capsule 1 and the injector 31 and the achievement of the close position between the capsule-holder 30 and injector 31, respectively. This position can also be detected by a suitable sensor, for example a micro-switch. This is followed by the step of injection of water and/or steam under pressure into the capsule, by means of the injector 31, preferably provided with its own perforating device of the sealing foil of the capsule, not shown in the figures. As said, the capsule-holder 30 is also preferably provided with its own perforating or laceration device of the bottom of the capsule, in order to obtain the dispensing of the liquid product by means of a corresponding duct and a nozzle, not shown.

After the injection and/or infusion—whose time can be predetermined or selected by the user, by means of a specific control—the actuation system 55-59 is operated in the direction opposite to the previous one, in order to bring the capsule-holder 30 towards the spaced-apart position with respect to the injector 31. The start of this retraction is shown in FIG. 30. During this retraction, the capsule 1 is again taken over by the jaws 50, essentially with their operation opposite to that described above, as shown in FIG. 30.

FIG. 31 highlights the achievement of the spaced-apart position by the capsule-holder 30 with respect to the injector 31. This position is detectable by means of a suitable sensor, for example a micro-switch, particularly in order to stop the motor 55.

Figure 33:
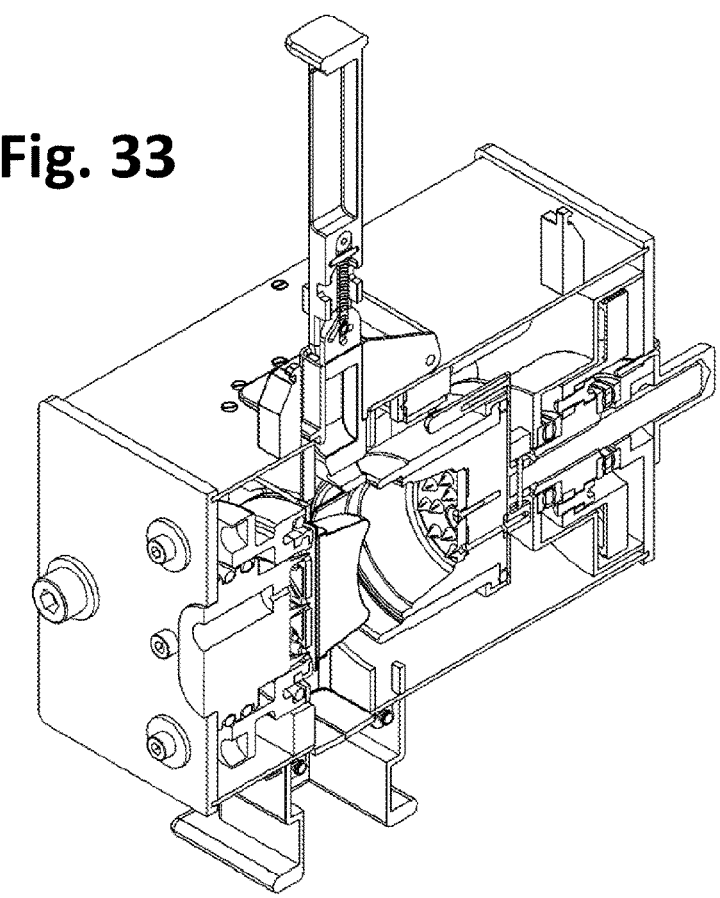

FIG. 32 shows the start of the displacement of the part 42 of the pusher 40 towards its axially aligned position relative to the part 41. This displacement is imparted manually by the user, with the lid 60 in the operating position, by producing the release of the part 42 from the corresponding element 23b. The achievement of the aforesaid aligned position, which is a stable angular position, as previously explained, is shown in FIG. 33.

Figure 34:
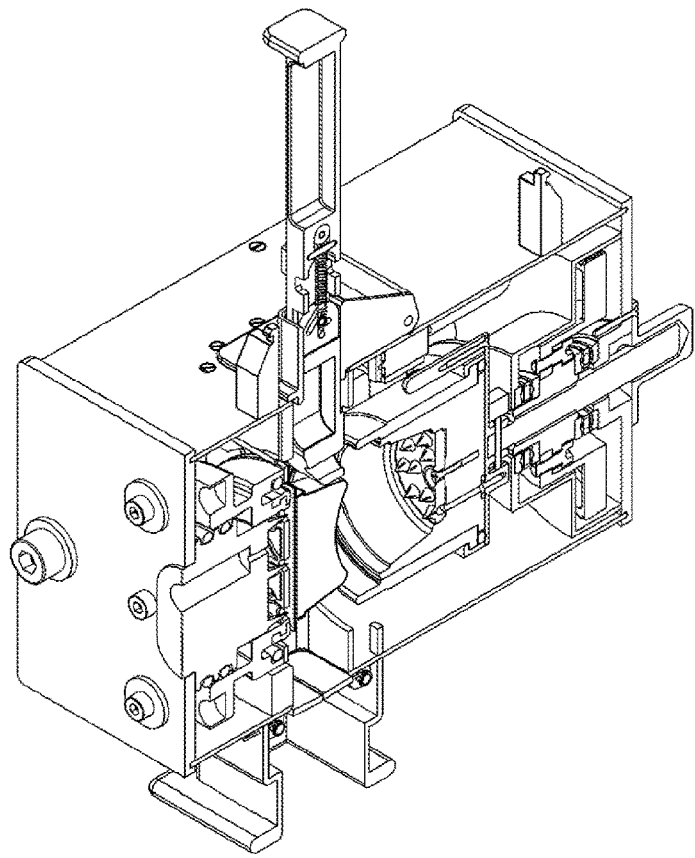

FIG. 34 shows the axial displacement of the pusher 40 along the guide 61 of the lid 60, i.e., its sliding along the axis B from the first to the second position. With this displacement, the head end 40a of the pusher 40 first enters into contact with the capsule 1, which is followed by a thrust in the direction of the outlet opening 27, as visible in the Figure. As a result of this thrust, the jaws 50 start to spread apart, as shown for example in FIG. 49.

Figure 50:
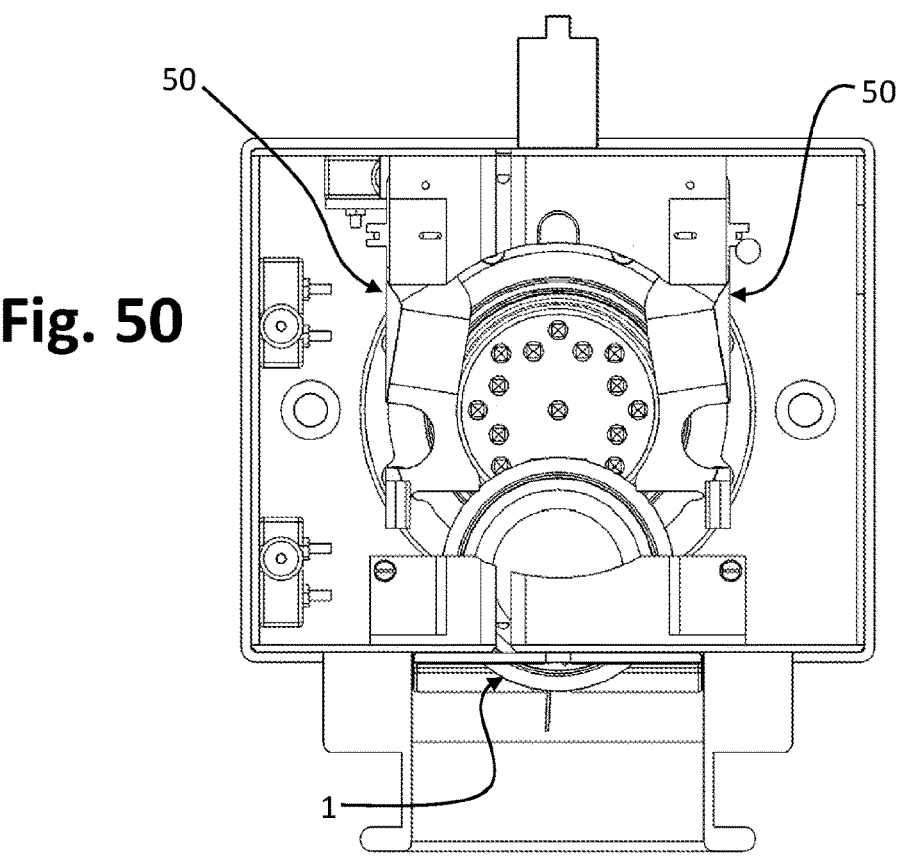

FIG. 35 shows the continuation of the displacement of the pusher 40 and the capsule 1, which causes the release of the capsule itself from the retaining position defined by the jaws 50, as also shown in FIG. 50. In this step, the capsule 1 also begins to press on the flap elements 70, which therefore begin to move towards the respective opening position.

The movement imparted to the pusher 40 continues until causing the complete opening of the flap elements 70 and the discharge of the used capsule 1 from the outlet opening, as shown in FIGS. 36, 37 and 38.

Figure 39:
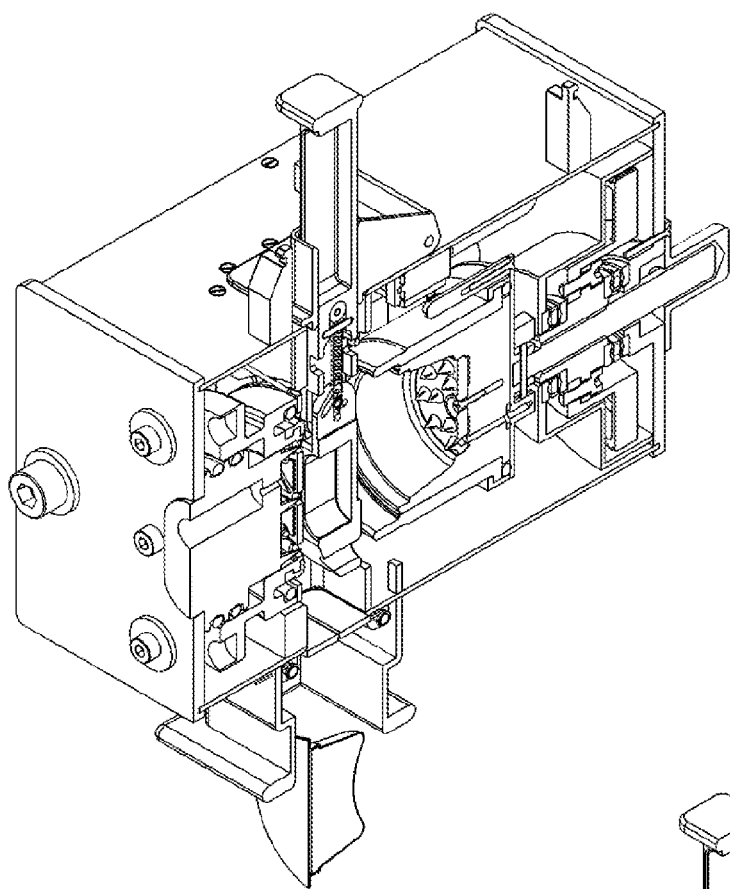
Figure 40:
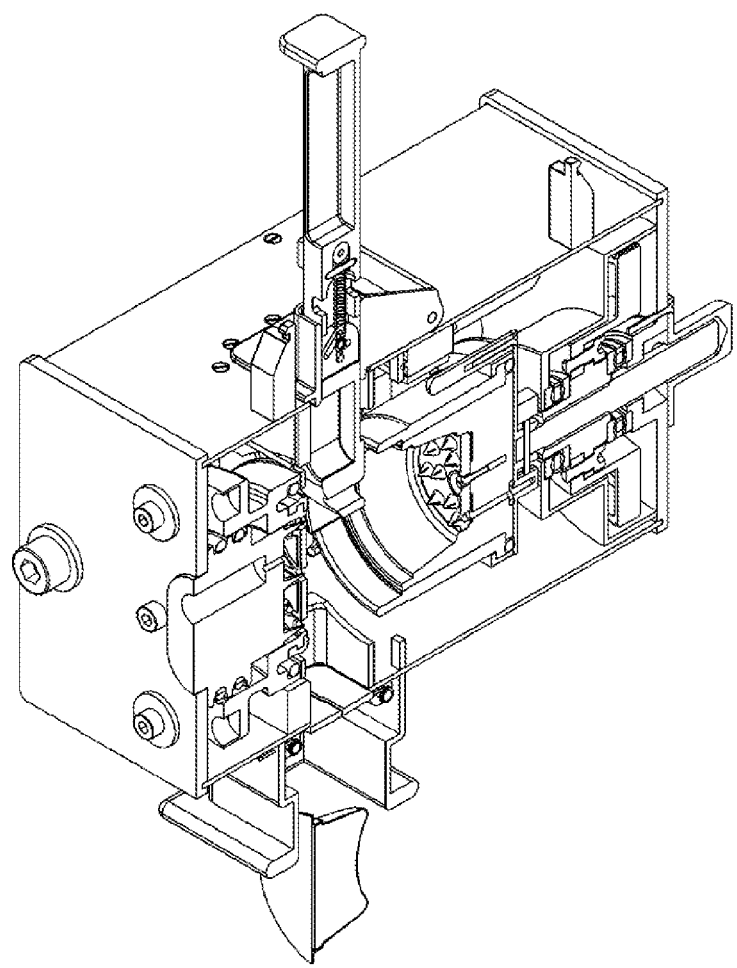

FIG. 39 shows the start of the inverse axial displacement, imparted manually to the pusher according to the axis B, from its second position towards its first position. This displacement continues until the condition of maximum permissible extraction of the pusher 40 from the guide 61, caused by the stroke-end arrangement previously exemplified (reference 85, FIG. 5): this condition is similar to that of FIG. 40.

Figure 41:
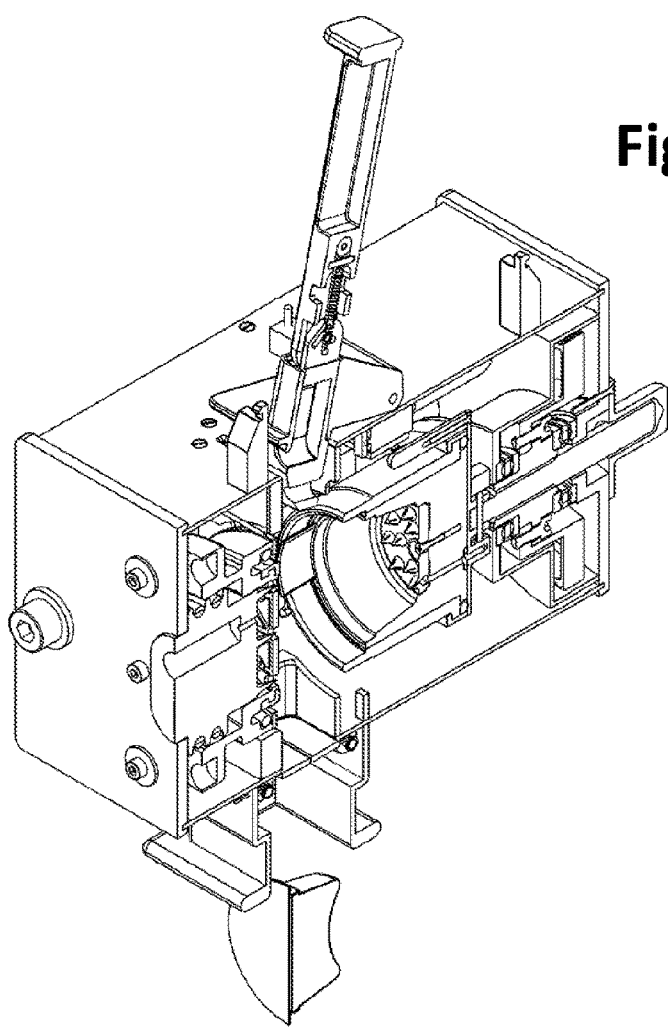
Figure 42:
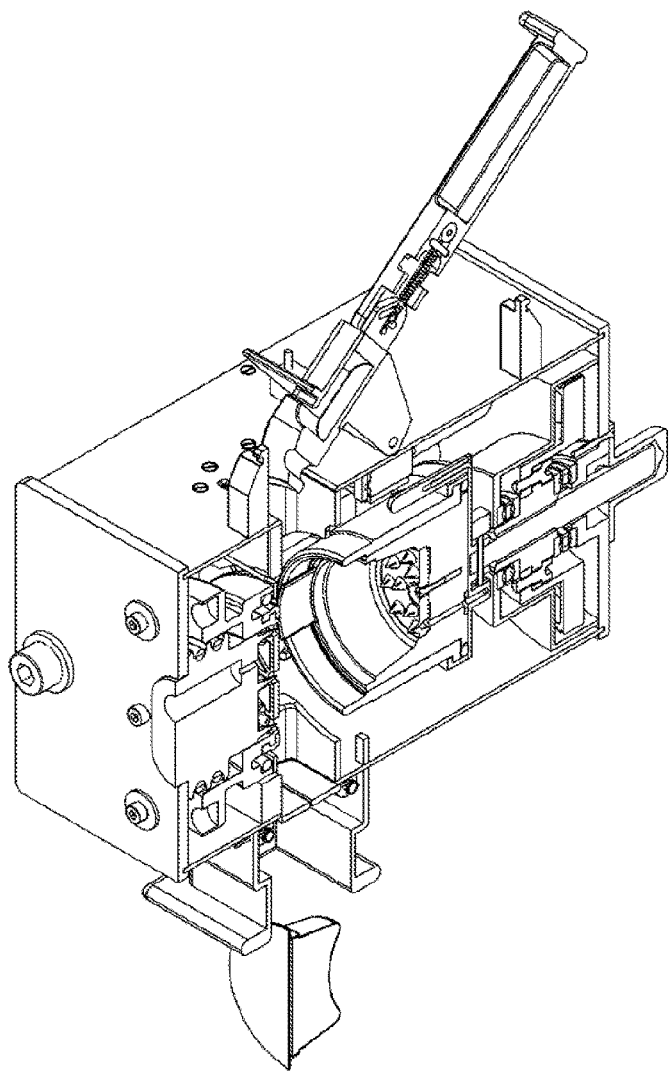
Figure 43:
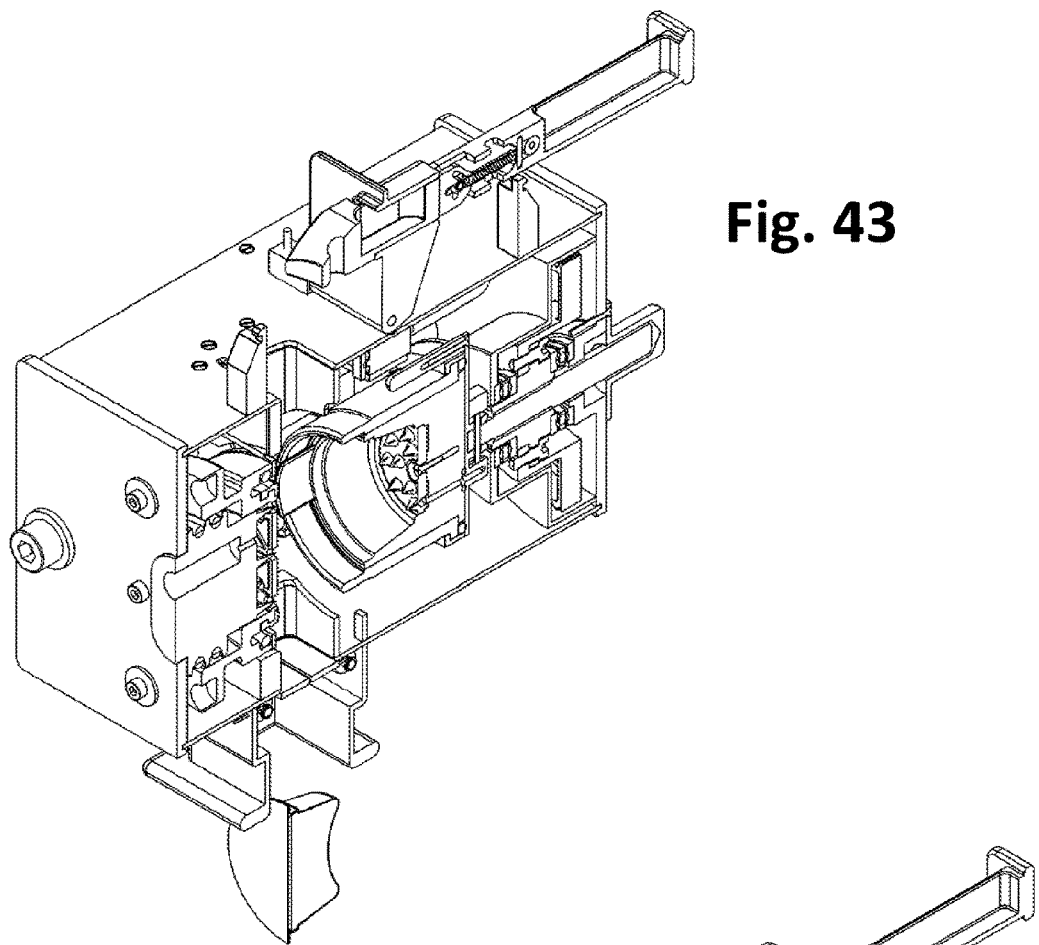

In the stable aligned position between the parts 41 and 42 of the pusher 40, the part 42 is operated by the user in the sense to initiate the passage of the lid 60 from its operative position to its inoperative position, as shown in FIG. 41. This movement proceeds until achieving the aforesaid inoperative position, of complete opening of the inlet passage 26, as shown in FIGS. 42 and 43. In the condition of maximum opening of the lid 60, which if necessary can be limited by means of a mechanical stroke-end, a further angular movement may possibly be imparted to the part 42 of the pusher 40 relative to the part 41, towards a relative non-stable position between the parts 41 and 42, in which the part 42 can be coupled to the stop element previously indicated by 23c (FIG. 5). This condition is shown in FIG. 44.

Figure 44:
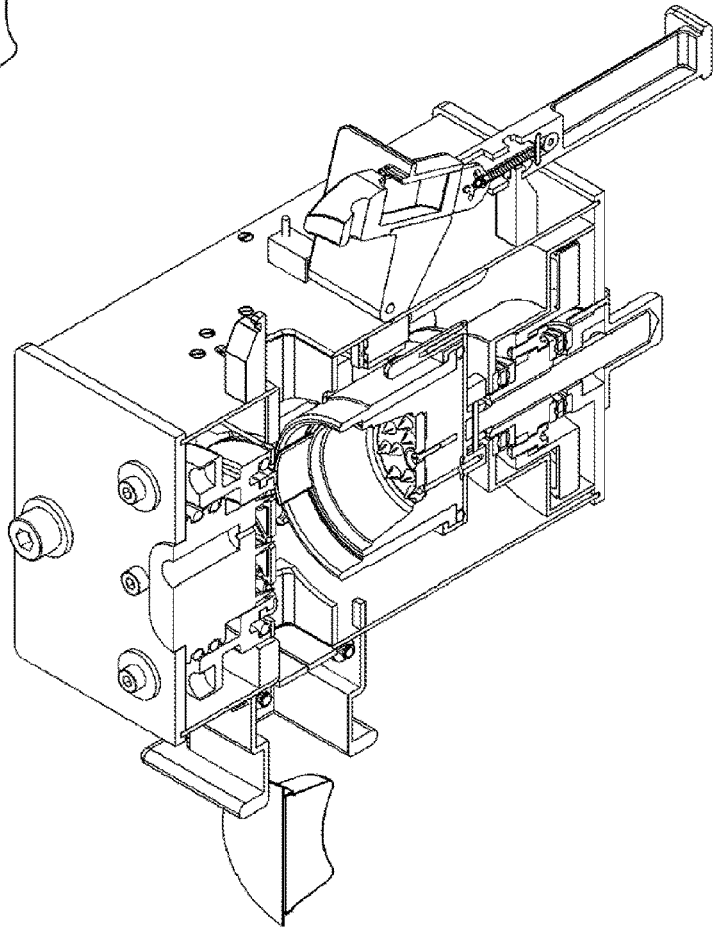
Figure 45:
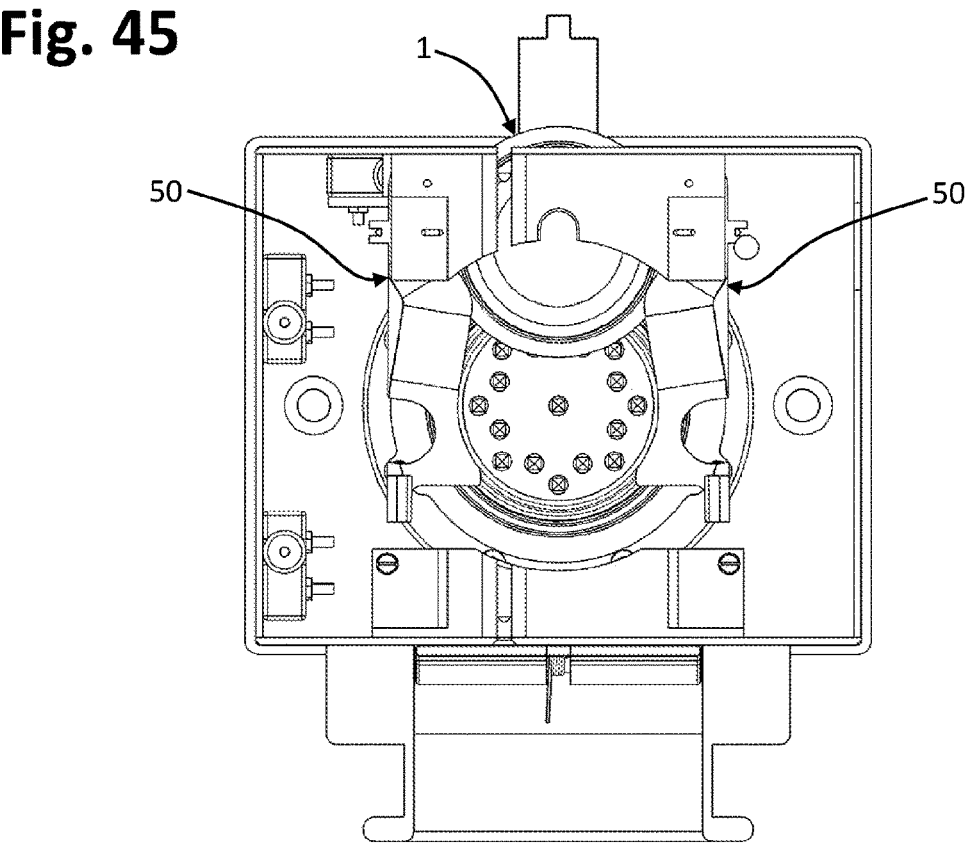
FIGS. 45-50 are views similar to those of FIG. 6, intended to exemplify an operating sequence of a retaining arrangement of a dispensing assembly of a machine according to an embodiment of the invention.
Figure 46:
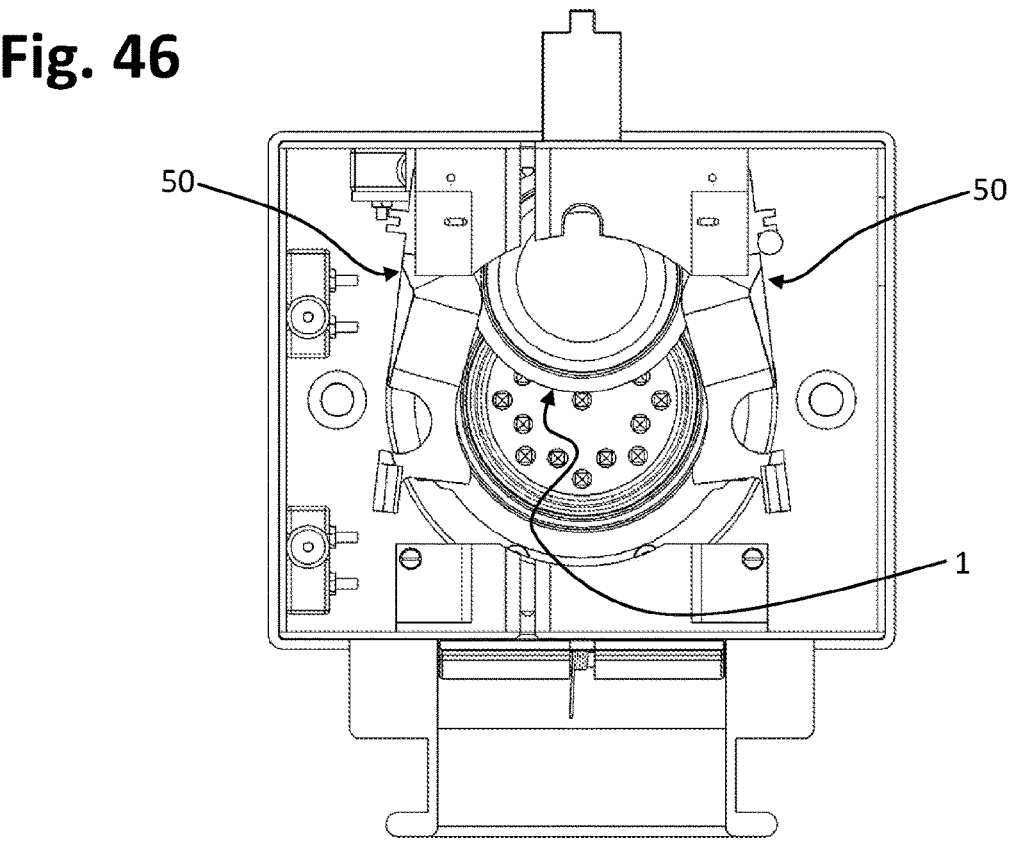
Figure 47:
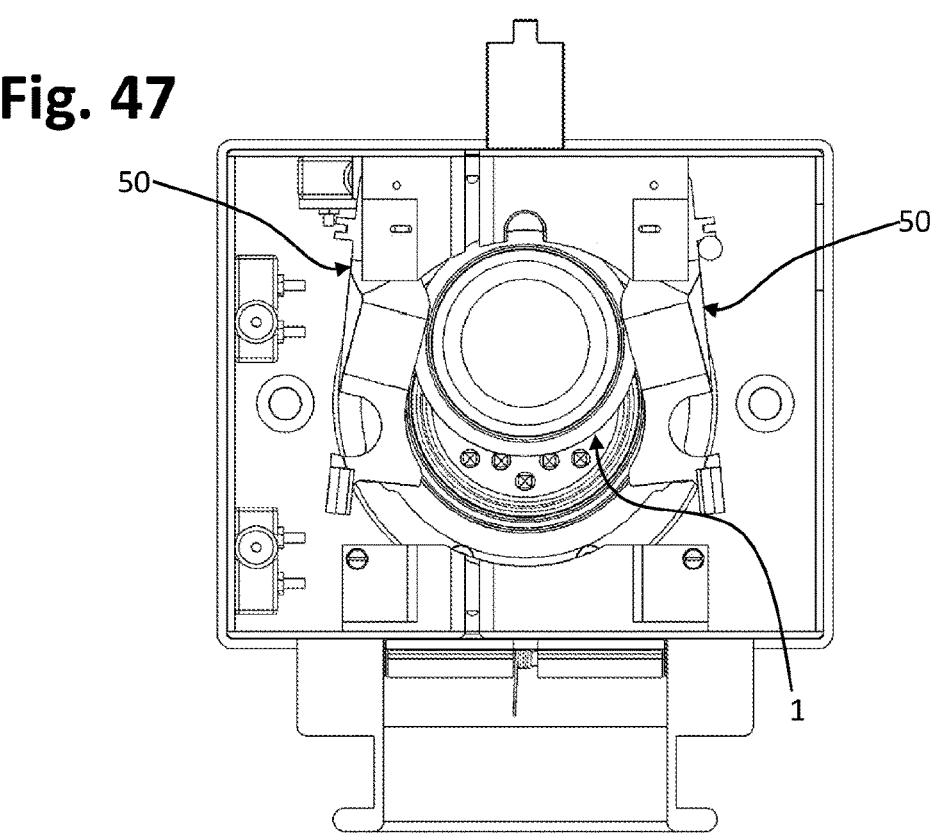
Figure 48:
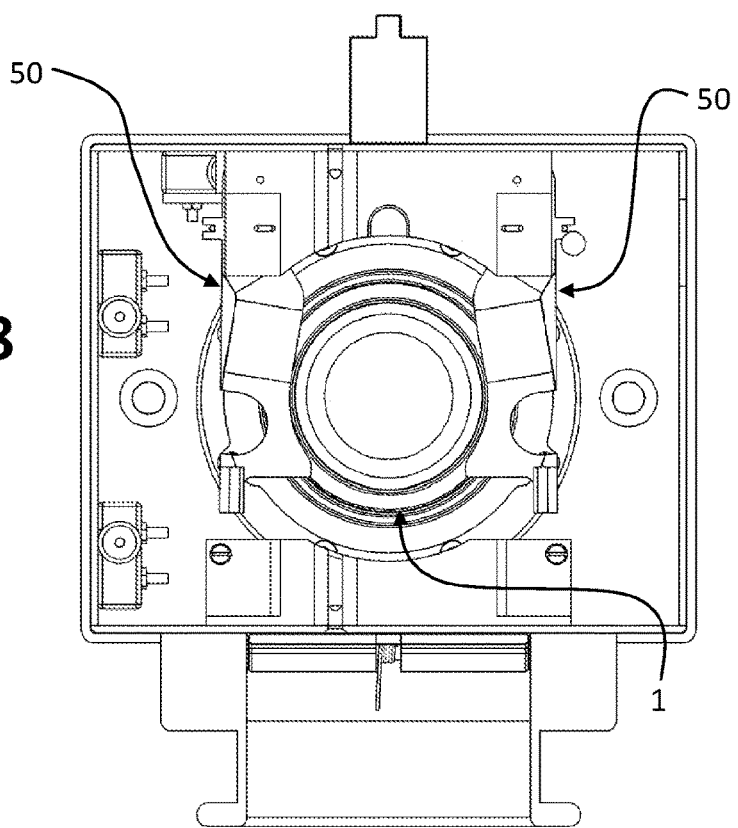
Figure 49:
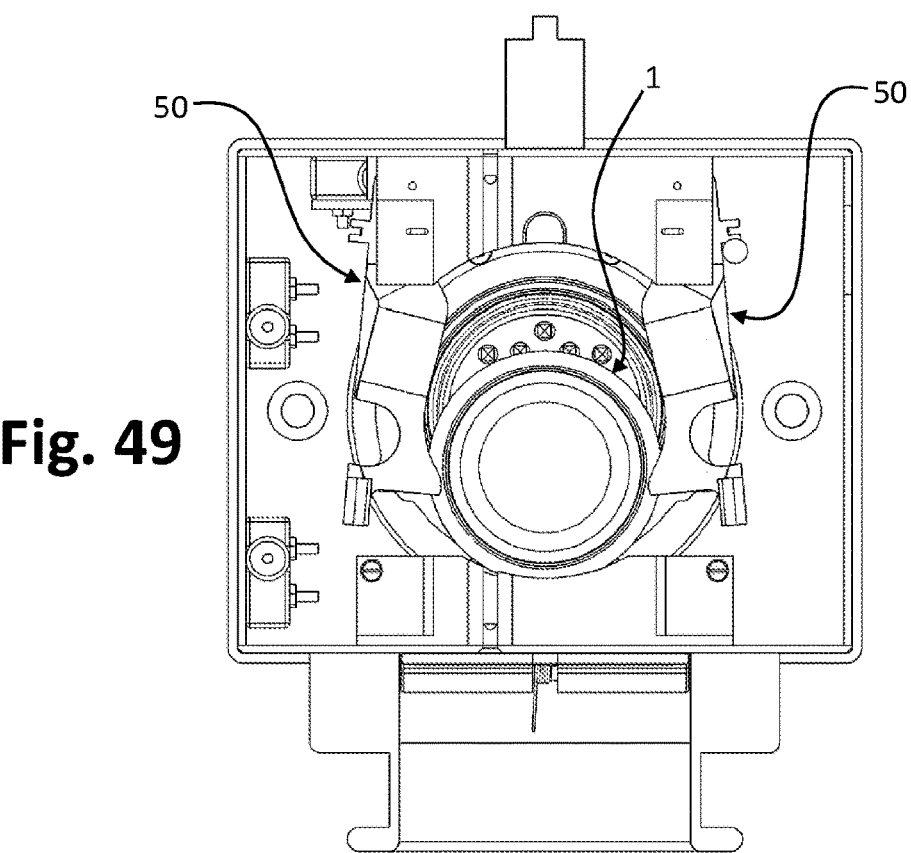

Starting from the condition of FIG. 44, for preparing a new liquid product, it is sufficient to insert a new capsule 1 into the inlet passage 26 and carry the parts 41 and 42 into the stable angular position of FIG. 19, and then repeat the procedure described above.

From the description provided, the characteristics and advantages of the present invention are clear, mainly represented by its simplicity of construction and use and by its compactness. The assembly is demonstrated to be hygienic and reliable, allowing on the one hand to obtain immediate expulsion of the used capsules and, on the other hand, reducing the risks of jamming, also by virtue of the fact that the expulsion command is performed in a direct manner by a user, without the mediation of relatively complicated automatic mechanisms, typical of the known art.

A substantial advantage of the invention is then represented by the fact that the assembly described is capable of use in different positions, in that the discharge of the used capsules is not obtained by gravity, but by virtue of a thrust action exerted by the user. It can therefore be appreciated that the assembly described can also be installed with a vertical actuation axis A (in which case the sliding axis B of the pusher will be horizontal), or rotated by 90° about the axis A with respect to the condition illustrated in the figures (in which case the inlet and outlet passages will be aligned horizontally to each other), or even rotated by 180° about the axis A with respect to the condition illustrated in the figures (in which case the inlet and outlet passages will be at the lower part and the upper part of the machine, respectively). In this context, the presence of the restraint means 80 is particularly advantageous, which allows the temporary retention of the capsule at the inlet opening even if this is in the lower part of the machine. The presence of the flap elements at the outlet passage is also very advantageous in the case of variable orientations of the machine, with the flap elements preventing the possible return of the discharged capsules into the assembly.

The invention therefore allows the production of machines that can be installed with different orientations, according to needs or conditions of use, e.g. on vehicles, aircrafts, orbital stations, narrow spaces, inside furniture, etc.

Without prejudice to the principle of the invention, the details of construction and the embodiments may vary, even significantly, with respect to what is illustrated herein purely by way of non-limiting example, without thereby departing from the scope of the invention, as defined by the claims that follow.

As mentioned, the retention means can be formed by guide elements engageable by the flange of a capsule: in this case as well, the possibility of deformation of the flange itself is exploited, in order to free it from the aforesaid members following the thrust generated by means of a pusher member of the type previously described.

The invention claimed is:

1. A dispensing assembly for a machine for preparing a liquid food product by means of capsules which have a body that houses a dose of a substance capable of forming a liquid food product by means of a fluid, such as water and/or steam, the dispensing assembly including
    a casing having an inlet passage, suitable to enable insertion of a capsule into the dispensing assembly in an insertion direction, the casing also having an outlet passage, suitable to enable discharge of the capsule from the dispensing assembly,
    an infusion chamber which comprises a first chamber part and a second chamber part, at least one chamber part defining a housing configured to receive at least partially the capsule,
    retention means, suitable to keep the capsule in a retaining position substantially coaxial to the first chamber part and the second chamber part, an actuation system, operable to cause relative movements between the first chamber part and the second chamber part according to an actuation axis, between a spaced-apart position and a close position, the actuation axis being generally transverse with respect to the insertion direction, wherein one of the first chamber part and the second chamber part is configured for supplying of the fluid in the capsule and the other one of the first chamber part and the second chamber part is configured for dispensing of the liquid food product from the infusion chamber, wherein the retention means are within the casing in a position intermediate to the inlet passage and the outlet passage, to be operative between the first chamber part and the second chamber part when said chamber parts are in the spaced-apart position, the dispensing assembly further comprising a guide member mounted movable on the casing at the inlet passage to be displaceable between an inoperative position and an operative position, in which the guide member allows or prevents access to the inlet passage, respectively, a longitudinally extended pusher member which is slidingly engaged in a respective through-guide of the guide member, to be displaceable according to a respective sliding axis between a first position and a second position, the sliding axis being generally transverse to the actuation axis when the guide member is in the operative position, and being generally transverse to the insertion direction when the guide member is in the inoperative position, in such a way that, with the guide member in the operative position and with the first chamber part and the second chamber part in the spaced-apart position, a displacement of the pusher member from the first position to the second position is capable of causing a thrust on the capsule towards the outlet passage, in order to free the capsule from the retention means.

2. The assembly according to claim 1, comprising at least one closing member mounted at the outlet passage to be displaceable between a closed position and an open position, the at least one closing member being elastically urged towards the closed position in such a way that the aforesaid thrust on the capsule towards the outlet passage causes passage of the at least one closing member from the closed position to the open position.

3. The assembly according to claim 1, wherein the pusher member comprises a plurality of parts connected in an articulated way, among which at least one first part, including a head end capable of coming into contact with the capsule, and one second part, including a rear end region operable by a user to cause said sliding of the pusher member between the first and the second positions, the first part and the second part being articulated in such a way that the second part is angularly displaceable about an axis which is generally transverse to the sliding axis.

4. The assembly according to claim 3, wherein the pusher member has at least one articulation, which is intermediate to the first part and the second part and which comprises a kinematic arrangement prearranged to define a first predefined angular position between the first part and the second part, in which said parts of the pusher member are substantially aligned according to the sliding axis.

5. The assembly according to claim 4, wherein the kinematic arrangement is prearranged to define at least one second predefined angular position between the first part and the second part, in which said parts of the pusher member are substantially arranged transversely to each other, particularly substantially perpendicular.

6. The assembly according to claim 1, also comprising stop means to retain the pusher member in a stationary position when the guide member is in at least one of its operative position and its inoperative position.

7. The assembly according to claim 1, wherein the guide member is hinged to rotate about an axis generally transverse to the sliding axis.

8. The assembly according to claim 2, wherein the at least one closing member comprises two flap elements mounted in opposed positions at the outlet passage, each flap element being displaceable between a respective closed position and a respective open position and being elastically urged towards the closed position.

9. The assembly according to claim 1, wherein the retention means comprise two jaw elements arranged at opposite parts with respect to the actuation axis, substantially in one and the same transverse plane.

10. The assembly according to claim 1, wherein the actuation system comprises an electric actuator, in particular a bidirectional electric motor.

11. The assembly according to claim 1, also comprising restraint means, prearranged to temporarily retain a capsule in an intermediate position between the inlet passage and the retention means.

12. The assembly according to claim 1, wherein the pusher member is constrained to the through-guide of the guide member in such a way that a head end of the pusher member is capable to exert on the capsule an initial thrust towards the outlet passage following upon passage of the guide member from the inoperative position to the operative position.

13. A machine for preparing liquid food products by means of capsules, comprising a dispensing assembly according to claim 1.

14. A system for preparing liquid food products, comprising a machine for preparing liquid food products by means of capsules, which includes a dispensing assembly according to claim 1, and a capsule containing a dose of at least one substance capable of forming a liquid food product by means of a fluid, such as water and/or steam.

* * * * *